US010211660B2

(12) United States Patent
Underwood et al.

(10) Patent No.: US 10,211,660 B2
(45) Date of Patent: Feb. 19, 2019

(54) LED LIGHTING DEVICE WITH ADAPTIVE PROFILES FOR CONTROLLING POWER CONSUMPTION

(71) Applicant: Cree, Inc., Durham, NC (US)

(72) Inventors: Robert Underwood, Santa Barbara, CA (US); John Roberts, Grand Rapids, MI (US)

(73) Assignee: Cree, Inc., Durham, NC (US)

( * ) Notice: Subject to any disclaimer, the term of this patent is extended or adjusted under 35 U.S.C. 154(b) by 250 days.

(21) Appl. No.: 15/190,832

(22) Filed: Jun. 23, 2016

(65) Prior Publication Data

US 2017/0231053 A1   Aug. 10, 2017

Related U.S. Application Data

(60) Provisional application No. 62/292,528, filed on Feb. 8, 2016.

(51) Int. Cl.
*H02J 1/12* (2006.01)
*H02J 3/02* (2006.01)
(Continued)

(52) U.S. Cl.
CPC ............. *H02J 7/0068* (2013.01); *F21S 8/086* (2013.01); *F21S 9/026* (2013.01); *F21S 9/028* (2013.01);
(Continued)

(58) Field of Classification Search
CPC .... G06T 7/20; G06T 5/50; F21S 8/086; F21S 9/028; F21S 9/026; F21S 9/03;
(Continued)

(56) References Cited

U.S. PATENT DOCUMENTS 7,213,940 B1   5/2007 van De Ven et al.
7,614,759 B2   11/2009 Negley
(Continued)

FOREIGN PATENT DOCUMENTS

WO   2006018604 A1   2/2006

OTHER PUBLICATIONS

Costa, M. A. D. et al., "A High Efficiency Autonomous Street Lighting System Based on Solar Energy and LEDs", Power Electronics Conference, 2009. COBEP '09. Brazilian, IEEE, Piscataway, NJ, USA, Sep. 27, 2009 (Sep. 27, 2009), pp. 265-273, XP031576100, ISBN: 978-1-4244-3369-8.
(Continued)

*Primary Examiner* — Carlos D Amaya
(74) *Attorney, Agent, or Firm* — Myers Bigel, P.A.

(57) ABSTRACT

A lighting device system includes light emitters where a battery powers the light emitters. A battery supplies the power for powering the light emitters and a driver is arranged to selectively power the light emitters to adjust an operating parameter of the at least one light emitter based on the charge status of the battery. The driver may be in communication with a GNSS receiver that provides geospatial information used to adjust the at least one parameter. The driver may power the light emitters according to a non-adaptive light level profile and an adaptive light level profile where the light emitters consume less energy when operated under the adaptive light level profile than when operated under the non-adaptive light level profile. A processing device operatively coupled to memory determines, based on a state of charge of the battery, which profile to run.

19 Claims, 13 Drawing Sheets

(51) Int. Cl.
| | |
|---|---|
| H02J 3/38 | (2006.01) |
| H02J 7/00 | (2006.01) |
| G06T 7/20 | (2017.01) |
| G06K 9/62 | (2006.01) |
| G06F 3/048 | (2013.01) |
| G06K 9/00 | (2006.01) |
| H04L 29/06 | (2006.01) |
| H05B 33/08 | (2006.01) |
| H05B 37/02 | (2006.01) |
| G01C 3/08 | (2006.01) |
| G01S 13/08 | (2006.01) |
| G01S 15/08 | (2006.01) |
| F21V 5/04 | (2006.01) |
| F21V 23/00 | (2015.01) |
| H04L 12/28 | (2006.01) |
| H04L 29/08 | (2006.01) |
| F21S 8/08 | (2006.01) |
| F21S 9/02 | (2006.01) |
| F21S 9/03 | (2006.01) |
| F21V 7/22 | (2018.01) |
| H02J 7/35 | (2006.01) |
| G06T 5/50 | (2006.01) |
| G06K 9/46 | (2006.01) |
| F21Y 103/10 | (2016.01) |
| F21Y 115/10 | (2016.01) |
| F21W 131/103 | (2006.01) |

(52) U.S. Cl.
CPC ................... *F21S 9/03* (2013.01); *F21V 5/04* (2013.01); *F21V 7/22* (2013.01); *F21V 23/003* (2013.01); *F21V 23/005* (2013.01); *G01C 3/08* (2013.01); *G01S 13/08* (2013.01); *G01S 15/08* (2013.01); *G06F 3/048* (2013.01); *G06K 9/00771* (2013.01); *G06K 9/00979* (2013.01); *G06K 9/4642* (2013.01); *G06K 9/4652* (2013.01); *G06K 9/6202* (2013.01); *G06T 5/50* (2013.01); *G06T 7/20* (2013.01); *H02J 7/35* (2013.01); *H04L 12/282* (2013.01); *H04L 63/0876* (2013.01); *H04L 67/12* (2013.01); *H05B 33/0815* (2013.01); *H05B 33/0827* (2013.01); *H05B 33/0845* (2013.01); *H05B 33/0854* (2013.01); *H05B 33/0872* (2013.01); *H05B 33/0884* (2013.01); *H05B 37/0218* (2013.01); *H05B 37/0227* (2013.01); *H05B 37/0272* (2013.01); *H05B 37/0281* (2013.01); *F21W 2131/103* (2013.01); *F21Y 2103/10* (2016.08); *F21Y 2115/10* (2016.08); *G06K 2009/00738* (2013.01); *G06T 2207/20216* (2013.01); *H05B 33/0857* (2013.01); *H05B 37/0245* (2013.01)

(58) Field of Classification Search
CPC . F21V 5/04; F21V 7/22; F21V 23/003; F21V 23/005; G01C 3/08; G01S 13/08; G01S 15/08; G06F 3/048; G06K 9/00771; G06K 9/6202; H02J 7/0068; H02J 7/35
USPC .......................................................... 307/21
See application file for complete search history.

(56) References Cited

U.S. PATENT DOCUMENTS

| | | |
|---|---|---|
| 8,084,963 B2 | 12/2011 | Chandler et al. |
| 8,476,836 B2 | 7/2013 | van de Ven et al. |
| 8,736,186 B2 | 5/2014 | Chobot |
| 8,742,671 B2 | 6/2014 | van de Ven et al. |
| 8,791,641 B2 | 7/2014 | van de Ven et al. |
| 8,810,144 B2 | 8/2014 | Hu et al. |
| 8,823,271 B2 | 9/2014 | van de Ven et al. |
| 8,829,821 B2 | 9/2014 | Chobot et al. |
| 8,912,735 B2 | 12/2014 | Chobot et al. |
| 8,975,827 B2 | 3/2015 | Chobot et al. |
| 9,101,021 B2 | 8/2015 | Lys |
| 9,131,561 B2 | 9/2015 | Athalye |
| 9,155,165 B2 | 10/2015 | Chobot |
| 9,155,166 B2 | 10/2015 | Chobot |
| 9,303,823 B2 | 4/2016 | Hu et al. |
| 2009/0129067 A1 | 5/2009 | Fan et al. |
| 2010/0269383 A1 | 10/2010 | Nifenecker |
| 2013/0026923 A1 | 1/2013 | Athalye et al. |
| 2013/0162153 A1 | 6/2013 | van de Ven et al. |
| 2013/0328073 A1 | 12/2013 | Lowes et al. |
| 2014/0001959 A1 | 1/2014 | Motley et al. |
| 2014/0167642 A1 | 6/2014 | Chobot |
| 2014/0268790 A1 | 9/2014 | Chobot et al. |
| 2015/0102729 A1 | 4/2015 | Creasman et al. |
| 2015/0312983 A1 | 10/2015 | Hu et al. |
| 2015/0351187 A1 | 12/2015 | McBryde et al. |

OTHER PUBLICATIONS

Cree, Inc., International Patent Application No. PCT/US2017/014666, International Search Report and Written Opinion, dated Apr. 4, 2017.
U.S. Appl. No. 61/932,058, filed Jan. 27, 2014.
U.S. Appl. No. 62/292,528, filed Feb. 8, 2016.
U.S. Appl. No. 14/669,739, filed Mar. 26, 2015.
U.S. Appl. No. 15/018,375, filed Feb. 8, 2016.

under 35 U.S.C.
LED LIGHTING DEVICE WITH ADAPTIVE PROFILES FOR CONTROLLING POWER CONSUMPTION This application claims benefit of priority under 35 U.S.C. § 119(e) to the filing date of U.S. Provisional Application No. 62/292,528, as filed on Feb. 8, 2016, which is incorporated herein by reference in its entirety.

BACKGROUND

Light emitting diode (LED) lighting devices are becoming more prevalent as replacements for older lighting systems. LED lighting devices are an example of solid state lighting (SSL) and have advantages over traditional lighting solutions such as incandescent and fluorescent lighting because they use less energy, are more durable, operate longer, can be combined in multi-color arrays that can be controlled to deliver virtually any color light, and generally contain no lead or mercury. A solid-state lighting device may take the form of a lighting unit, light fixture, light bulb, or a lamp.

An LED lighting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Light perceived as white or near-white may be generated by a combination of red, green, and blue ("RGB") LEDs. Output color of such a lighting device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

LED lighting devices typically include LED electronics such as a driver to supply and control the low voltage direct current used by the LEDs and to protect the LEDs from voltage and/or current fluctuations.

It is also known to provide communication connectivity capabilities in a LED lighting device for receiving, and/or transmitting, signals between the lighting device and external devices and/or between lighting devices.

LED lighting devices may be powered by rechargeable batteries that use renewable energy sources to charge the batteries. An effective battery operated system should provide a continuous, uninterrupted source of power for the lighting devices.

SUMMARY OF THE INVENTION

In some embodiments, a lighting device system comprises at least one light emitter. A battery powers the at least one light emitter. The battery has a charge status corresponding to the amount of available energy. A driver is arranged to selectively power the at least one light emitter to adjust at least one operating parameter of the at least one light emitter based on the charge status of the battery.

A GNSS receiver may provide geospatial information used by the driver to adjust the at least one parameter. The driver may power the at least one light emitter according to a non-adaptive light level profile. The non-adaptive light level profile may be a function of the at least one operating parameter over a period of time. The at least one operating parameter may be selected from at least one of power consumed by the at least one light emitter and light intensity of light emitted by the at least one light emitter. The period of time may be determined based on a geospatial location of the at least one light emitter. The driver may be arranged to selectively power the at least one light emitter according to an adaptive light level profile, where the at least one light emitter consumes less power when operated under the adaptive light level profile than when operated under the non-adaptive light level profile. The adaptive light level profile may be created based on the charge status of the battery. The battery may be rechargeable and may be charged by a renewable energy source. The at least one light emitter may comprise a plurality of LEDs arranged in an array and the driver may selectively power the plurality of LEDs to change the energy drawn from the battery by the plurality of LEDs based on a comparison of available energy of the battery to energy required to run the non-adaptive light level profile.

In some embodiments, a lighting device system comprises at least one light emitter and a battery for powering the at least one light emitter. The system also comprises a memory and a processing device operatively coupled to the memory. The processing device is configured to: implement a non-adaptive light level profile for controlling the at least one light emitter; determine if a state of charge of the battery is sufficient to run the non-adaptive light level profile; and implement an adaptive light level profile for controlling the at least one light emitter if the state of charge of the battery is not sufficient to run the non-adaptive light level profile, where the at least one light emitter consumes less energy when operated under the adaptive light level profile than when operated under the non-adaptive light level profile.

The battery may be rechargeable. A plurality of lighting devices may be provided where the plurality of lighting devices are powered by the battery and the processor may be in network communication with the plurality of lighting devices. The processing device may be in communication with a GNSS receiver that provides geospatial information to the processing device. The processing device may be configured to calculate the non-adaptive light level profile based at least in part on the geospatial information. The non-adaptive light level profile may be a first function of power drawn from the battery over time and the adaptive light level profile may be a second function of power drawn from the battery over time where the non-adaptive light level profile and the adaptive light level profile may each be based at least in part on solar time and/or a 24 hour clock. The processing device may be configured to determine if a state of charge of the battery is sufficient to run the non-adaptive light level profile for an autonomy period. The light intensity of the at least one light emitter may be less when operated on the adaptive light level profile than when operated on the non-adaptive light level profile. The processing device may be configured to determine if a state of charge of the battery is sufficient to run the non-adaptive light level profile by comparing available energy of the battery to energy required to run the non-adaptive light level profile where the battery's available energy is based at least in part on a maximum depth of charge of the battery.

In some embodiments a method of operating a lighting device system comprising at least one light emitter and a rechargeable battery for powering the at least one light emitter is provided. The method comprises: controlling the at least one light emitter using a non-adaptive light level profile where the non-adaptive light level profile requires a first amount of energy; determining if a state of charge of the battery is sufficient to run the non-adaptive light level profile; controlling the at least one light emitter using an adaptive light level profile if the state of charge of the battery is not sufficient to run the non-adaptive light level profile where the adaptive light level profile requires a second amount of energy that is less than the first amount of energy; and calculating at least one of the adaptive light level profile and the non-adaptive light level profile using the geospatial location of the at least one light emitter.

DETAILED DESCRIPTION

Figure 1:
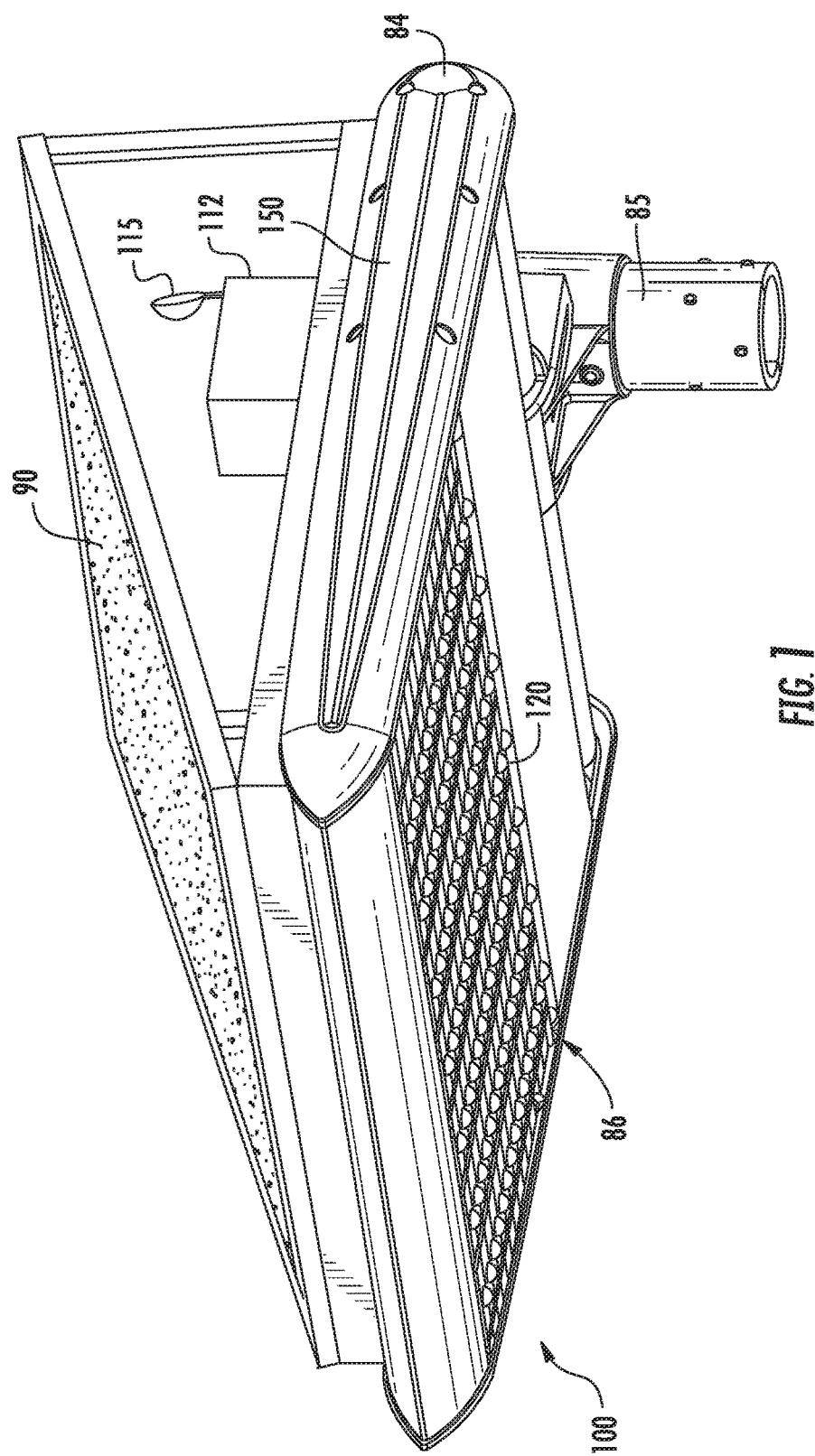
FIG. 1 is a perspective view showing a lighting device according to embodiments of the invention.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the figures. It will be understood that these terms and those discussed above are intended to encompass different orientations of the device in addition to the orientation depicted in the figures.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

The terms "light emitter," "solid state light emitter" or "solid state emitter" as used herein (which may be qualified as being "electrically activated") may include a LED, laser diode, OLED diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials (hereinafter referred to collectively as "LEDs").

As used herein, the term LED may comprise packaged LED chip(s) or unpackaged LED chip(s). LED elements or modules of the same or different types and/or configurations. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to the heat sink or another type of board or substrate. Depending on the embodiment, the lighting device can employ LED arrangements or lighting arrangements using remote phosphor technology as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, each LED element or module or a plurality of such elements or modules may include one or more blue shifted yellow LEDs and one or more red or red/orange LEDs as described in U.S. Pat. No. 7,213,940, assigned to the assignee of the present invention and hereby incorporated by reference. In some embodiments, each LED element or module or a plurality of such elements or modules may include one or more blue LEDs with a yellow or green phosphor and one or more blue LEDs with a red phosphor. The LEDs may be disposed in different configurations and/or layouts as desired, for example utilizing single or multiple strings of LEDs where each string of LEDs comprise LED chips in series and/or parallel. Different color temperatures and appearances could be produced using other LED combinations of single and/or multiple LED chips packaged into discrete packages and/or directly mounted to a printed circuit board as a chip-on board arrangement. In one embodiment, the light source comprises any LED, for example, an XP-Q LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, other LED arrangements are possible. In some embodiments, a string, a group of LEDs or individual LEDs can comprise different lighting characteristics and by independently controlling a string, a group of LEDs or individual LEDs, characteristics of the overall light out output of the device can be controlled.

In some embodiments, each LED element or module may comprise one or more LEDs disposed within a coupling cavity with an air gap being disposed between the LED element or module and a light input surface. In any of the embodiments disclosed herein each of the LED element(s) or module(s) can have different or the same light distribution, although each may have a directional emission distribution (e.g., a side emitting distribution), as necessary or desirable. More generally, any lambertian, symmetric, wide angle, preferential-sided or asymmetric beam pattern LED element(s) or module(s) may be used as the light source.

Moreover, depending on the embodiment, the desired light distribution can be achieved by single primary optics of packaged LEDs and/or combinations of the primary optics of packaged LEDs with single or multiple secondary optics. Optical components can be the same or vary from LED element to LED element depending on the desired lighting characteristics of the luminaire. In some embodiments, LED optics can employ waveguide technology where internal reflection of light is utilized along with light extraction features to achieve a desired light distribution Solid state light emitting devices according to embodiments of the present disclosure may include, but are not limited to, III-V nitride based LED chips or laser chips fabricated on a silicon, silicon carbide, sapphire, or III-V nitride growth substrate, including (for example) devices manufactured and sold by Cree, Inc. of Durham, N.C. Solid state light emitters may be used individually or in groups to emit one or more beams to stimulate emissions of one or more lumiphoric materials (e.g., phosphors, scintillators, lumiphoric inks, quantum dots, day glow tapes, etc.) to generate light at one or more peak wavelength(s), or of at least one desired perceived color (including combinations of colors that may be perceived as white). Lumiphoric materials may be provided in the form of particles, films, or sheets.

Inclusion of lumiphoric (also called 'luminescent') materials in lighting devices as described herein may be accomplished by any suitable means, including: direct coating on solid state emitters, dispersal in encapsulant materials arranged to cover solid state emitters; coating on lumiphor support elements (e.g., by powder coating, inkjet printing, or the like); incorporation into diffusers or lenses; and the like.

The expressions "lighting device" and "light emitting device" as used herein are not limited, except that such elements are capable of emitting light. That is, a lighting device can be a device which illuminates an area or volume, a building or structure, a swimming pool or spa, a room, an indicator, a road, a parking lot, or an outdoor area, a vehicle, signage (e.g., road signs or a billboard), a consumer product, an electronic device, a boat, an aircraft, a lamppost, or a device that is used for edge or back-lighting, light bulbs, bulb replacements (e.g., for replacing AC incandescent lights, low voltage lights, fluorescent lights, etc.), outdoor lighting, street lighting, security lighting, exterior residential lighting (wall mounts, post/column mounts), ceiling fixtures/wall sconces, under cabinet lighting, lamps, landscape lighting, track lighting, task lighting, specialty lighting, ceiling fan lighting, archival/art display lighting, high vibration/impact lighting-work lights, etc. In certain embodiments, lighting devices as disclosed herein may be self-ballasted. In certain embodiments, a light emitting device may be embodied in a light bulb or a light fixture. In certain embodiments, a "lighting system" may include one lighting device or multiple lighting devices.

Methods include illuminating an object, a space, or an environment, utilizing one or more lighting devices or lighting systems as disclosed herein. In certain embodiments, a lighting device as disclosed herein includes multiple LED components arranged in an array (e.g., a two or three dimensional array). The lighting devices as described herein may include at least one rechargeable battery for providing power to power the light emitters. The battery may be the primary source of power for the lighting device. The battery may be recharged by an off-grid renewable energy source. For example, the battery may be recharged using solar energy provided by a photovoltaic system or by wind energy. In some embodiments geothermal energy or hydropower may also be the renewable energy source used to recharge the battery.

Disclosed herein are lighting devices and lighting systems arranged to receive or determine information indicative of geospatial or geographic location (and optionally additional information such as time, time zone, and/or date) and automatically adjust one or more light operating parameters of the light emitter based at least in part on such information and on the battery's state of charge. Light output parameters that may be adjusted according to certain embodiments include any parameter that affects power usage by the light emitters such as luminous flux, intensity, color, operating times, spectral content or the like. In certain embodiments, a lighting device may provide light of an intensity/brightness level and/or spectral content based on the location of the lighting device, the time of day, day of week and season, and the state of charge of the battery.

In certain embodiments, a signal used by a lighting device or lighting system, and indicative of or permitting derivation of geospatial position, is provided by at least one of a user input element, a signal receiver, and/or one or more sensors. In certain embodiments, any one or more of a user input element, a signal receiver, and one or more sensors may be arranged in, arranged on, or supported by a body structure of a lighting device. In certain embodiments, any one or more of a user input element, a signal receiver, and one or more sensors may be physically separated from a body structure containing emitters of a lighting device, but may be arranged in communication with a driver module of a lighting device via wireless or wired communication.

Since a lighting device or lighting system as disclosed herein can automatically determine its geospatial position (and optionally, time, time zone and date), in certain embodiments, a lighting device can automatically adjust its operating parameters in a manner suitable for the geospatial position and the current date and time and based on the state of charge of the battery.

In certain embodiments, a lighting device or lighting system includes, or is arranged in at least intermittent communication with, a global navigation satellite system (GNSS) receiver, such as a global positioning system (GPS) receiver, that is arranged to receive global positioning coordinates (e.g., latitude and/or longitude coordinates) or other information as indicative of geospatial position. A GNSS receiver may also provide accurate time and date information useable by the lighting device or lighting system. In certain embodiments, a GNSS receiver of a lighting device (e.g., an outdoor floodlight) is positioned in direct line-of-sight communication with a GNSS satellite. In certain embodiments, a GNSS receiver is part of the lighting device and in other embodiments the GNSS receiver is positioned remotely from the lighting device but is arranged to communicate a received GNSS signal to the lighting device via either wired or wireless transmission.

In certain embodiments, the geospatial position of the lighting device may be obtained by an electronic device such as a smartphone or other portable digital device, computer, server or the like having integrated GPS, WiFi, and/or cellular communication capabilities that provide the portable digital device with location information, and such location information may be communicated to a lighting device by either wireless or wired means. The geospatial position of the lighting device may also be obtained by receiving a signal via WiFi, ZigBee, Bluetooth, infrared, modulated light, audio tone, Ethernet, or another wired or wireless connection where a signal with IP address information may be used to determine at least approximate geospatial position. In certain embodiments, a signal receiver may also receive time and date information from one or more proximate IP-enabled servers, routers, or other devices. Other methods of obtaining geospatial position information and time and date information may also be used.

In certain embodiments, the device for obtaining geospatial information may be integrated with a lighting device; alternatively, the device for obtaining geospatial information may be separable from a lighting device and communicate signals via wired or wireless communication.

In certain embodiments, any one or more of various types of sensors may be included in, or in at least intermittent communication with, a lighting device or lighting system. In certain embodiments, a lighting device may have associated therewith at least one of an ambient light sensor (e.g., arranged to sense intensity and/or spectral content of ambient light), an occupancy sensor (e.g., arranged to detect a condition indicating that an illuminated space is or is not occupied by at least one person), an image sensor (e.g., still or video), a sound sensor (e.g., microphone), and a temperature sensor (e.g., thermistor). If multiple sensors are provided, they may be used to sense the same or different environmental conditions. If multiple sensors are used to sense the same environmental conditions, different types of sensors may be used. In certain embodiments, one or more sensors may be arranged in a sensor module arranged in or on a lighting device. In certain embodiments, one or more sensors may be arranged remotely from a lighting device but in communication with the lighting device via wired or wireless signal transmission. In some embodiments, a sensor may be an antenna for the GNSS receiver.

In certain embodiments the battery used to power the light emitters uses smart battery technology. A smart battery system comprises a rechargeable battery or battery pack with a built-in battery management system. The battery management system includes a bus interface that allows it to connect to and communicate with an external controller and charger. The smart battery can internally measure voltage and current, and deduce charge level and State of Health parameters, indicating the state of the battery. The smart battery can provide a signal to a controller or processing device indicative of battery charge, state of health parameters and the like. The battery management system may be incorporated in the battery or battery pack, in the charger for the battery or in a separate module.

As noted previously, one or more operating parameters of a lighting device may be adjusted at least in part based on information indicative of geospatial or geographic location, and optionally additional information such as time, time zone, and/or date, and based on the output of the battery management system based on, for example, charge level, remaining estimated run time, battery life, state of health and the like. Examples of operating parameters that may be adjusted include intensity or luminous flux of emissions, operating time, color point of emissions, color temperature of emissions, and/or spectral content of emissions. In certain embodiments, a lighting device includes multiple independently controllable light emitters (or groups of light emitters) having different color points.

In certain embodiments, a light level profile for operation of a lighting device or lighting system may be selected by a user, such as by using one or more user input elements. In certain embodiments, a lighting device may be configured to accept user inputs to initiate actions, to accept user inputs to adjust response of a lighting device to time of day, and/or accept user inputs to adjust response to an ambient lighting condition.

In certain embodiments, a lighting device or lighting system includes at least one signal transmitter and/or receiver, such as may be optionally embodied in at least one transceiver. In certain embodiments, a transmitter and/or receiver may be arranged to transmit and/or receive radio frequency signals.

In certain embodiments, a lighting device may communicate with one or more other lighting devices such that the devices can share information. This may be useful when a first lighting device lacks a clear connection to a desired GPS signal, user input, other external signal, or other sensory input, but when a second lighting device has a clear connection. In other embodiments only selected ones of the lighting devices in a network of lighting devices may include the smart battery, control logic, sensors, GNSS receiver or the like and the other lighting devices may be controlled by the selected ones of the lighting devices in a master/slave relationship. In such an instance, the selected lighting device may receive a signal from a GNSS satellite, a user input device, a RF receiver, or one or more sensors, and the selected lighting device may transmit the received information, or instructions based on the received information, to other connected lighting devices to permit the other lighting devices to take appropriate action (e.g., update geospatial position, update time/date, adjust profiles, and/or adjust operating parameters). Via either wired or wireless communication, one lighting device may propagate information to one or more other lighting devices, and the shared information may be used to automatically adjust one or more light output parameters to cause the lighting devices to operate one or more light emitters differently based at least in part on battery conditions.

Additional features of lighting devices, lighting systems, and related methods according to the present disclosure may be understood with reference to the figures. Various types of lighting devices and systems are contemplated according to embodiments of the disclosure. Certain embodiments may be directed to lighting fixtures (including in-ceiling, recessed, pendant, and surface mount varieties), light bulbs, street lamps, indoor lamps, outdoor lamps, desk lamps, floor-standing lamps, and so on.

The power saving techniques described herein may be particularly useful in off-grid lighting devices. Off-grid as used herein means that at least some of the power, and in some embodiments all of the power, used to power the lighting device is provided from a source without the support of remote infrastructure such as an electrical grid. One exemplary embodiment of such a lighting device is illustrated in FIG. 1. An off-grid lighting device 100 comprises a body 84, a light source 86 comprising a LED array 120 comprising a plurality of light emitters, a smart battery 150 and a renewable energy source such as photovoltaic panel 90. The body houses the light source 86 and further includes driver circuitry, a communication module, GNSS module, and a user input port as will be described. The lighting device of FIG. 1 is embodied as an outdoor lamp that may be mounted on a support structure such as a pole 85. The lighting device may be mounted on other support structures such as a building, vehicle or the like. FIG. 1 is merely exemplary of an embodiment of a lighting device that may utilize the power saving techniques of the invention and numerous different configurations may exist for the body, battery, and photovoltaic panel.

Figure 2:
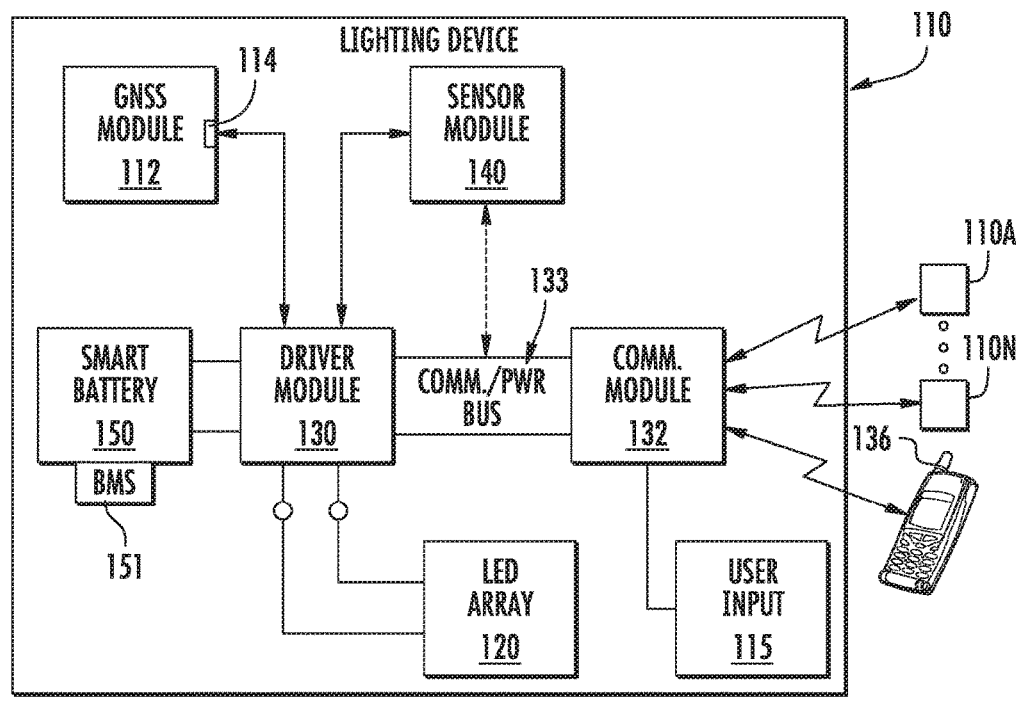
FIG. 2 is an embodiment of a block diagram of the major control systems of the lighting device of FIG. 1.

Turning now to FIG. 2, a block diagram 110 showing the major components of an embodiment of a lighting device is provided. In certain embodiments, the driver module 130, communication module 132, and LED array 120 may be connected to form core electronics of the lighting device. The communication module 132 may be configured to bidirectionally communicate with other lighting devices 110A-110N as well as one or more user input elements 136 via wired or wireless connection. In certain embodiments, a standard communication interface and a first (or standard) protocol may be used between the driver module 130 and the communication module 132, thereby permitting different driver modules 130 to communicate with and be controlled by different communication modules 132. The term "standard protocol" may be defined to mean any type of known or future developed, proprietary, or industry-standardized protocol.

Figure 10:
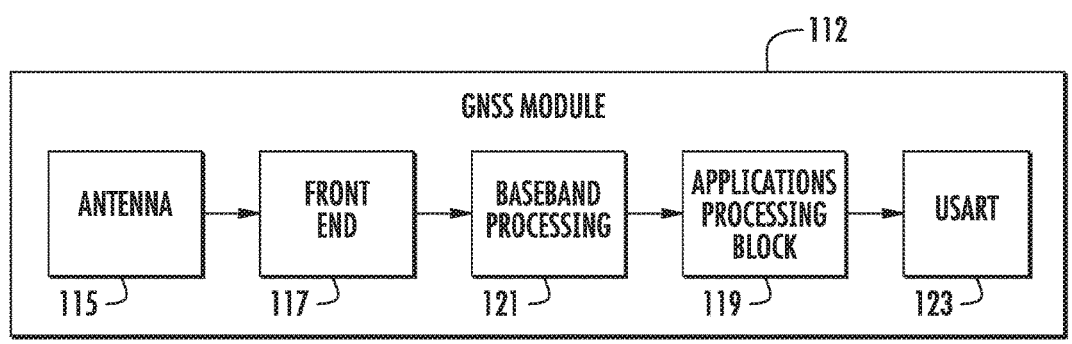
FIG. 10 is an embodiment of a block diagram of a GNSS module usable in the system of FIG. 2.

A global navigation satellite system (GNSS) module or receiver 112 is provided that comprises an antenna 115 (See FIGS. 1 and 10). The receiver, such as a global positioning system (GPS) receiver, is arranged to receive global positioning coordinates (e.g., latitude and/or longitude coordinates) or other information as indicative of geospatial position. A GNSS receiver may also provide accurate time and date information useable by operating and control systems of the lighting device. The GNSS module 112 may also comprise a communication port 114 for communicating with the driver module 130, communication module or communication/power bus. The port may comprise a USART (Universal Synchronous/Asynchronous Receiver/Transmitter) that facilitates communication through a serial port using the RS-232C protocol. Other suitable communication devices and protocols may also be used.

In the illustrated embodiment, the driver module 130 and a communication module 132 are coupled via communication and power buses 133, which may be separate or integrated with one another. A communication bus allows the communication module 132 to receive information from the driver module 130 as well as control the driver module 130. An exemplary communication bus is the well-known inter-integrated circuitry (I2C) bus, which is a serial bus and is typically implemented with a two-wire interface employing data and clock lines. Other available buses include: serial peripheral interface (SPI) bus, Dallas Semiconductor Corporation's 1-Wire serial bus, universal serial bus (USB), RS-232, Microchip Technology Incorporated's UNI/O®, and the like. In certain embodiments, one or more user input elements 115 may be coupled to the communication bus or the communication module 132.

The driver module 130 may be configured to also collect data from a sensor module 140, which may include an ambient light sensor, an occupancy sensor, temperature sensor and/or any other suitable sensors disclosed herein. The driver module 130 is further arranged to drive LEDs of the LED array 120. Data collected from the sensor module 140, GNSS module 112 as well as any other operational parameters of the driver module 130 may be shared with the communication module 132 and with each other. As such, the communication module 132 may collect data about the configuration or operation of the driver module 130 and any information made available to the driver module 130 by the GNSS module 112, LED array 120 and/or the sensor module 140. The collected data may be used by the communication module 132 to control operation of the driver module 130, may be shared with other lighting devices 110A-110N or user input devices 136, or may be processed to generate data or instructions that are sent to other lighting devices 110A-110N.

In certain embodiments, the communication module 132 may communicate with a remotely located entity, such as other lighting devices 110A-110N. The communication module 132 may process sensor data and/or instructions provided by the other lighting devices or a remotely located user input device 136, and then provide instructions over the communication bus to the driver module 130. The communication module 132 may therefore facilitate the sharing of system information with the driver module 130, which may use internal logic to determine what action(s) to take. The driver module 130 may respond by controlling the drive current or voltages provided to the LED array 120 as appropriate.

When the driver module 130 provides the primary intelligence for its respective lighting device, the communication module 132 may act as an intelligent communication interface to facilitate communications between the driver module 130 and one or more sensors 140 and/or one or more remote input elements 110A-110N, 136. The sensor(s) 140 and/or remote input element(s) may be configured to communicate in a wired or wireless fashion.

Alternatively, each driver module 130 may be primarily configured to drive the light emitters of light source 86 based on instructions from the communication module 132. In such an embodiment, the primary intelligence of each lighting device may be provided in the communication module 132, which may embody an overall control module with wired or wireless communication capability. Each communication module 132 may include or have associated therewith at least one transceiver 18 (FIG. 13) wherein each transceiver may be optionally replaced with separate transmitter and receiver components. Each communication module 132 may facilitate the sharing of intelligence and signals among the various lighting devices 110A-110N and input devices 136.

A battery 150 provides the primary power for the system and to power the light emitters. The battery 150 may be a rechargeable battery and may be recharged using the renewable energy source such as photovoltaic panel 90 shown in FIG. 1. The battery 150 uses smart battery technology. A smart battery system comprises a rechargeable battery or battery pack with a built-in battery management system (BMS) 151. The battery management system includes a bus interface that allows it to connect to and communicate with an external controller and charger. The smart battery can internally measure voltage and current, and deduce charge level and State of Health parameters, indicating the state of the battery. The battery 150 may also include a thermal management system 153 that in low temperature operating conditions may include self-heating elements and may include protection circuits to protect the battery from overheating during charging of the battery and/or heat dissipating elements to dissipate heat during charging and/or use of the battery. The smart battery can provide a signal to the driver module 130, communication module 132 or bus 133 indicative of battery charge, state of health parameters and the like. The battery management system may be incorporated in the battery or battery pack, in the charger for the battery or in a separate module.

Figure 3:
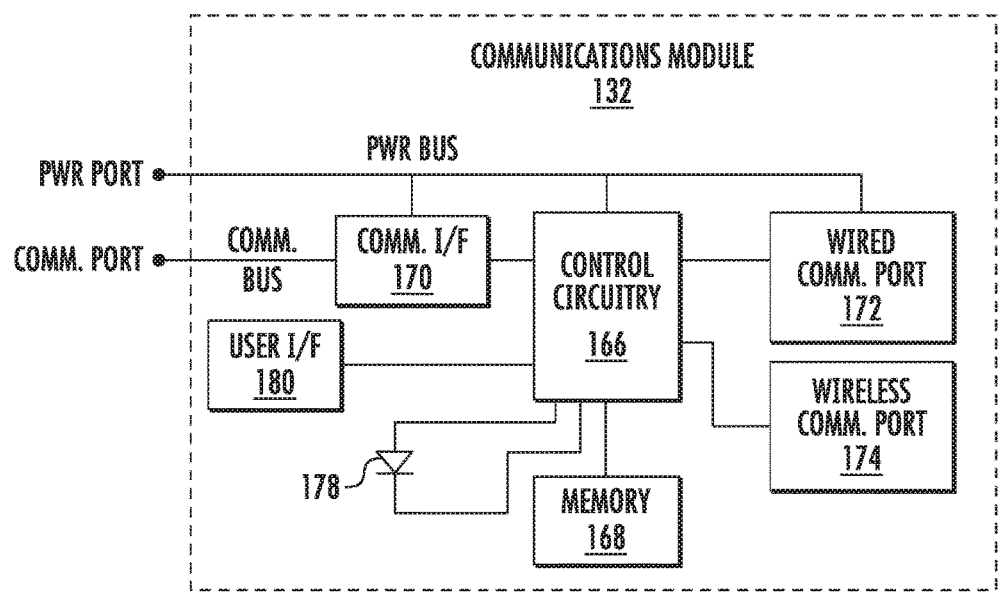
FIG. 3 is an embodiment of a block diagram of a communications module usable in the system of FIG. 2.

Turning to FIG. 3, a block diagram of a communications module 132 according to one embodiment is provided. The communications module 132 includes control circuitry or processing device 166 and associated memory 168, which contains the software instructions and data to facilitate operation as described herein. The control circuitry/processing device may be embodied as a CPU, processor, microprocessor, microcontroller or the like. The control circuitry 166 may be associated with a communications interface 170, which is to be coupled to the driver module 130, either directly or indirectly via the communication bus. The control circuitry 166 may be associated with a wired communication port 172, a wireless communication port 174, or both, to facilitate wired or wireless communications with other lighting devices 110A-110N, one or more user input devices 136, and remote control entities. The wireless communication port 174 may include the requisite transceiver electronics to facilitate wireless communications with remote entities. The wired communication port 172 may support universal serial bus (USB), Ethernet, or like interfaces.

Capabilities of the communication module 132 may vary from one embodiment to another. For example, the communication module 132 may act as a simple bridge between the driver module 130 and the other lighting devices 110A-110N or remote input devices 136. In such an embodiment, the control circuitry 166 may primarily pass data and instructions received from the other lighting fixtures 110 or remote control entities to the driver module 130, and vice-versa. The control circuitry 166 may translate the instructions as necessary based on the protocols being used to facilitate communications between the driver module 130 and the communications module 132 as well as between the communication module 132 and any remote entities.

In other embodiments, the control circuitry 166 may play an important role in coordinating intelligence and sharing data among the lighting devices 110A-110N as well as providing significant, if not complete, control of the driver module 130. The control circuitry 166 may also be configured to receive data and instructions from the other lighting devices 110A-110N or remote control entities and use this information to control the driver module 130. The communication module 132 may also provide instructions to other lighting devices 110A-110N and remote entities based on data received from the driver module 130, GNSS module 112 and/or the sensor module 140, as well as data and instructions received from any remote entitles and/or other lighting devices 110A-110N.

Power for the control circuitry 166, memory 168, the communication interface 170, and the wired and/or wireless communication ports 172 and 174 may be provided over the power bus via the power port. As noted above, the power bus may receive its power from the driver module 130, which generates a usable DC power signal. The power port and the communication port may be separate or may be integrated with the standard communication interface. The power port and communication port are shown separately for clarity. In one embodiment, the communication bus is a 2-wire serial bus, wherein the connector or cabling configuration may be configured such that the communication bus and the power bus are provided using four wires: data, clock, power, and ground.

With continued reference to FIG. 3, the communication module 132 may include a status indicator, such as an LED 178 to indicate the operating state of the communication module 132. Further, a user interface 180 may be provided to allow a user to manually interact with the communication module 132. The user interface 180 may include an input mechanism, an output mechanism, or both. An input mechanism may include one or more of buttons, keys, keypads, touchscreens, or the like. An output mechanism may include one more LEDs, a display, or the like. The term "button" as used herein may include a push button switch, all or part of a toggle switch, rotary dial, slider, or any other mechanical input mechanism.

Figure 4:
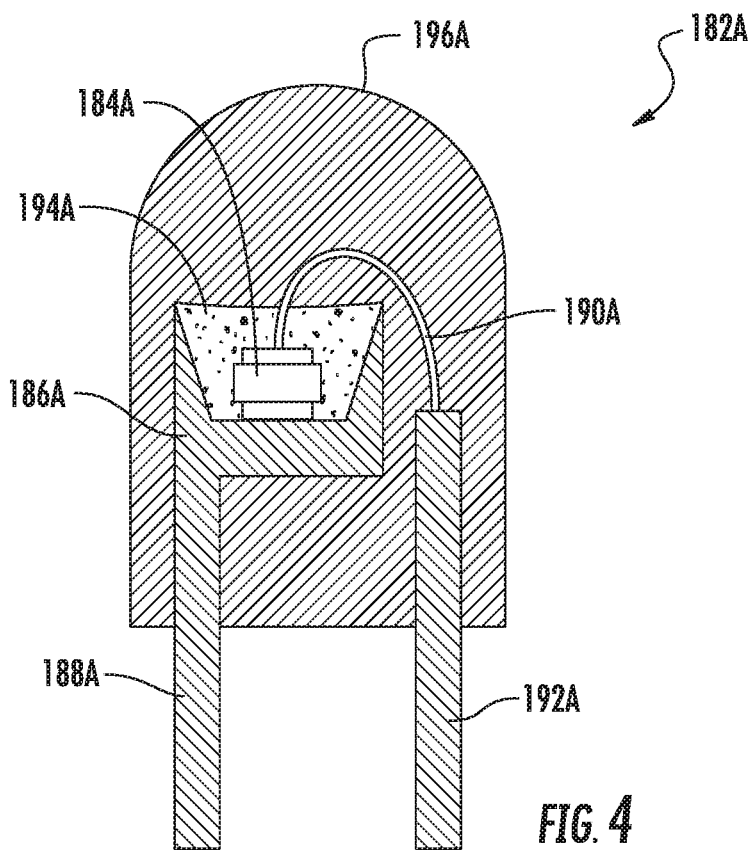
FIGS. 4 and 5 are a side views of an exemplary light emitters usable in the lighting device of the invention.

A description of an exemplary embodiment of the LED array 120 and driver module 130 follows. The LED array 120 includes a plurality of light emitters, which may be embodied, for example, in LEDs 182A and/or LEDs 182B illustrated in FIGS. 4 and 5. With reference to FIG. 4, a single LED chip 184A is mounted on a reflective cup 186A using solder or a conductive epoxy, such that ohmic contacts for the cathode (or anode) of the LED chip 184A are electrically coupled to the bottom of the reflective cup 186A. The reflective cup 186A is either coupled to or integrally formed with a first lead 188A of the LED 182A. One or more bond wires 190A connect ohmic contacts for the anode (or cathode) of the LED chip 184A to a second lead 192A.

The reflective cup 186A may be filled with an encapsulant material 194A that encapsulates the LED chip 184A. The encapsulant material 194A may be clear or contain a wavelength conversion material, such as a phosphor or other lumiphoric material. The entire assembly is encapsulated in a clear protective resin 196A, which may be molded in the shape of a lens to control the light emitted from the LED chip 184A.

Figure 5:
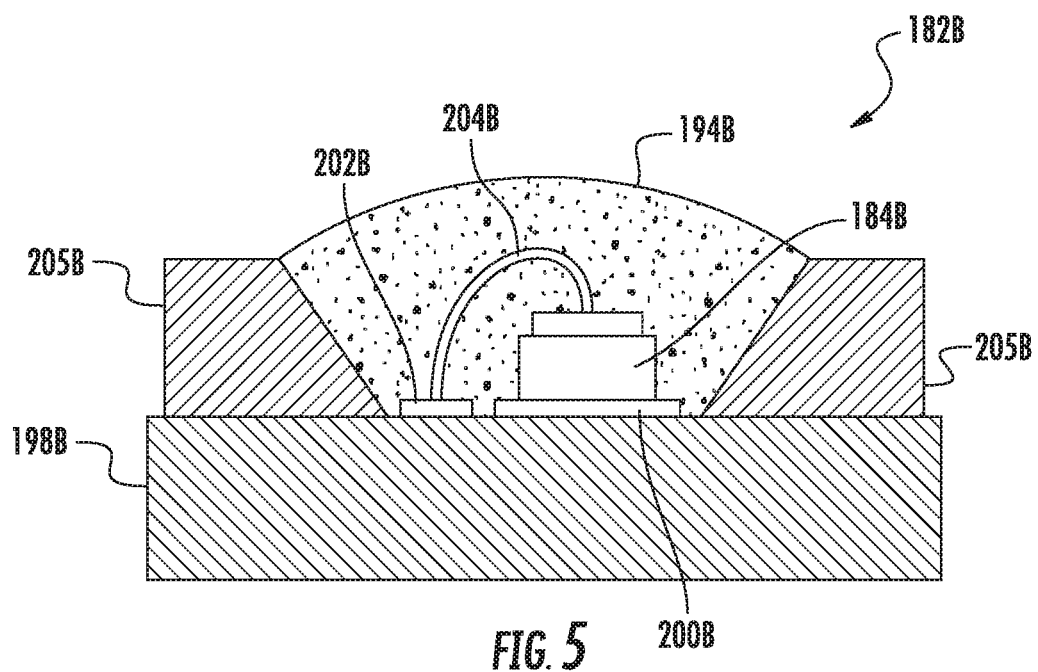

An alternative LED package 182B is illustrated in FIG. 5 wherein the LED chip 184B is mounted on a substrate 198B. In particular, the ohmic contacts for the anode (or cathode) of the LED chip 184B are directly mounted to first contact pads 200B on the surface of the substrate 198B. The ohmic contacts for the cathode (or anode) of the LED chip 184B are connected to second contact pads 202B, which are also on the surface of the substrate 198B, using bond wires 204B. The LED chip 184B resides in a cavity of a reflector structure 205B, which is formed from a reflective material and functions to reflect light emitted from the LED chip 184B through the opening formed by the reflector structure 205B. The cavity formed by the reflector structure 205B may be filled with an encapsulant material 194B that encapsulates the LED chip 184B. The encapsulant material 194B may be clear or contain a wavelength conversion material, such as a phosphor or other lumiphoric material.

In either of the embodiments of FIGS. 4 and 5, if the encapsulant material 194A, 194B is clear, then the light emitted by the respective LED chip 184A, 184B passes through the encapsulant material 194A, 194B and the protective resin 196A without any substantial shift in color.

Alternatively, if the encapsulant material 194A, 194B contains a wavelength conversion material, then some or all emissions of the LED chip 184A, 184B in a first wavelength range may be absorbed by the wavelength conversion material, which will responsively emit light in a second wavelength range. The concentration and type of wavelength conversion material will dictate how much of the light emitted by the LED chip 184A, 184B is absorbed by the wavelength conversion material as well as the extent of the wavelength conversion. In embodiments where some of the light emitted by the LED chip 184A, 184B passes through the wavelength conversion material without being absorbed, light passing through the wavelength conversion material will mix with light emitted by the wavelength conversion material. Thus, when a wavelength conversion material is used, the light emitted from the LED package 182A, 182B is shifted in color from the actual light emitted from the LED chip 184A, 184B contained therein.

A generic LED package that may embody features of either the LED package 182A or the LED package 182B is referred to herein as "LED 182" and a generic LED chip such as may be embodied in LED chip 184A or LED chip 184B is referred to herein as "LED chip 184."

LED array 120 may include a group of blue shifted yellow ("BSY") or blue shifted green ("BSG") LEDs 182 as well as a group of red LEDs 182. A BSY LED 182 includes a LED chip 184 that emits bluish light, and a wavelength conversion material such as a yellow phosphor that absorbs at least a portion of the blue light and emits yellowish light. The resultant mixture of light emitted from the overall BSY LED 182 may embody yellowish light.

In a similar manner, BSG LEDs 182 include a LED chip 184 that emits bluish light in combination with a wavelength conversion material such as a greenish phosphor that absorbs at least a portion of the blue light and emits greenish light. The resultant mixture of light emitted from the overall BSG LED 182 may embody greenish light.

Red LEDs 182 generally emit reddish light at a color point on the opposite side of the Black Body Locus BBL as the yellowish or greenish light of BSY or BSG LEDs 182A, 182B. As such, the reddish light from red LEDs 182 may mix with yellowish or greenish light emitted from BSY or BSG LEDs 182 to generate white light that has a desired color temperature and falls within a desired proximity of the BBL. Red LEDs 182 may include LED chips 184 that natively emit reddish light in the absence of wavelength conversion material, or alternatively may include a red-emitting wavelength conversion material arranged to be stimulated by a shorter wavelength (e.g., UV- or blue-emitting) LED wherein the wavelength conversion material generates reddish light.

A blue LED chip 184 used to form either a BSY or BSG LED 182 may be formed from a gallium nitride (GaN), indium gallium nitride (InGaN), silicon carbide (SiC), zinc selenide (ZnSe), or a like material system. A red LED chip 184 may be formed from an aluminum indium gallium nitride (AlInGaP), gallium phosphide (GaP), aluminum gallium arsenide (AlGaAs), or a like material system. Exemplary yellow phosphors include cerium-doped yttrium aluminum garnet (YAG:Ce), yellow BOSE (Ba, 0, Sr, Si, Eu) phosphors, and the like. Exemplary green phosphors include green BOSE phosphors, Lutetium aluminum garnet (LuAg), cerium doped LuAg (LuAg:Ce), and the like. The above-described and illustrated LED architectures, phosphors, and material systems are merely exemplary and are not intended to provide an exhaustive listing of architectures, phosphors, and materials systems that are applicable to the concepts disclosed herein.

In one embodiment, a LED array 120 my include a first LED group of only low BSY-L LEDs, a second LED group of only high BSY-H LEDs, and a third LED group of only red LEDs. The currents used to drive the first, second, and third LED groups may be independently controlled such that the intensity of the light output from the first, second, and third LED groups is independently controlled. As such, light output of the first, second, and third LED groups may be blended or mixed to generate light having a desired color.

In one embodiment, the CCT of the overall light output may be adjusted over a range from about 2700 K to about 5700 K. In another embodiment, the CCT of the overall light output may be adjusted over a range from about 3000 K to 5000 K. In yet another embodiment, the CCT of the overall light output may be adjusted over a range from about 2700 K to 5000 K. These variations in CCT can be accomplished while maintaining a high color rendering index value (CRI), such as a CRI equal to or greater than 90. Although the preceding discussion has emphasized mixtures of light creating white light, it is to be emphasized that multiple LEDs may be driven to provide aggregate output of other colors.

Figure 6:
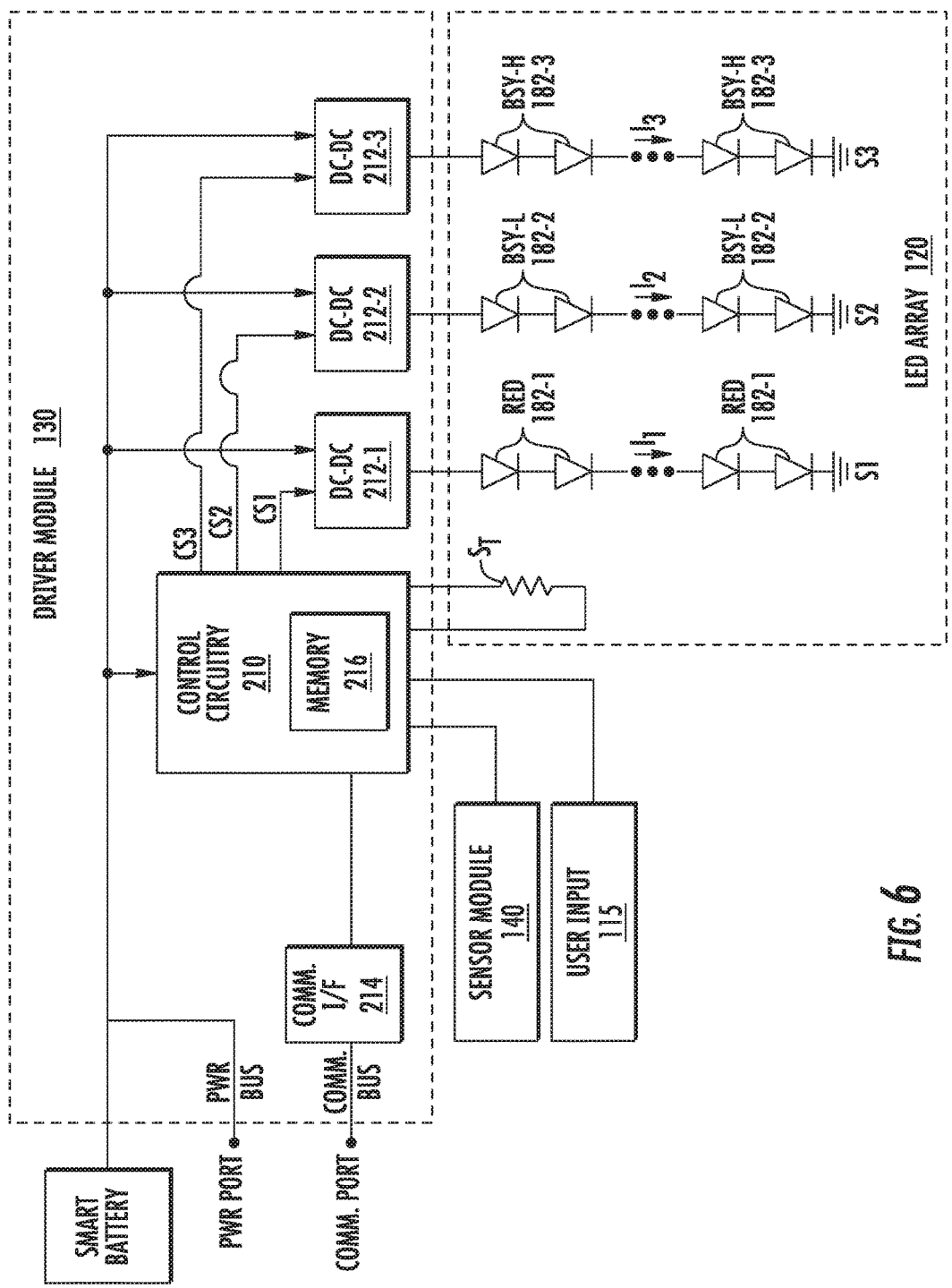
FIG. 6 is an embodiment of a block diagram of the driver module usable in the system of FIG. 2.

FIG. 6 illustrates a driver module 130 for driving a LED array 120 according to one embodiment of the disclosure. The LED array 120 may be divided into multiple strings of series-connected LEDs 182. A first LED string S1 includes multiple red LEDs 182-1, a second LED string S2 includes multiple low BSY LEDs 182-2, and a third LED string S3 includes multiple high BSY LEDs 182-3.

For clarity, the various LEDs of the LED array 120 are referenced as RED, BSY-L, and BSY-H in FIG. 6 to clearly indicate which LEDs are located in the various LED strings S1, S2, and S3. While BSY LEDs 182-2, 182-3 are illustrated, BSG or other wavelength converted (e.g., phosphor coated) LEDs may be employed in analogous fashion. For example, a string of high BSG-H LEDs 182-3 may be combined with a string of low BSG-L LEDs 182-2, and vice versa. Further, a string of low BSY-L LEDs 182-2 and/or high BSG-H LEDs 182-3 may be combined with one or more red LED, and vice versa. Non-phosphor-converted LEDs of various colors, such as non-wavelength converted red, amber, green, cyan, and blue LEDs, may also be employed in certain embodiments.

In general, the driver module 130 controls the currents $i_1$, $i_2$, and $i_3$ that are used to drive the respective LED strings S1, S2, and S3. The ratio of currents $i_1$, $i_2$, and $i_3$ provided to the respective LED strings S1, S2, and S3 may be adjusted to effectively control the relative intensities of the reddish light emitted from the red LEDs 182-1 of LED string S1, the yellowish/greenish light emitted from the low BSY-L LEDs 182-2 of LED string S2, and the yellow/greenish light emitted from the high BSY-H LEDs 182-3 of LED string S3. The resultant light from each LED string S1, S2, and S3 mixes to generate an overall light output that has a desired color, CCT, and intensity (which may also be referred to as a dimming level). The overall light output may be white light that has a desired CCT.

The number of LED strings S1, S2, S3 may vary from one to many and different combinations of LED colors may be used in the different strings. Each LED string S1, S2, S3 may have LEDs 182 of the same color, variations of the same color, or substantially different colors. In the illustrated embodiment, each LED string S1, S2, S3 is configured such that all of the LEDs 182-1, 182-2, 182-3 within each individual string are all essentially identical in color. However, in certain embodiments, the LEDs 182-1, 182-2, 182-3 in each string may vary substantially in color or embody completely different colors in certain embodiments. In certain embodiments, three LED strings S1, S2, S3 with red, green, and blue LEDs may be used, wherein each LED string S1, S2, S3 embodies LED dedicated to a single color. In yet another embodiment, at least two LED strings S1, S2 may be used, wherein different colored BSY or BSG LEDs are used in one LED string S1 and red LEDs are used another LED string S2. A single string embodiment is also envisioned, where currents may be individually adjusted for the LEDs of the different colors using controllable bypass circuits, controllable shunt circuits, or the like.

The driver module 130 illustrated in FIG. 6 generally includes control circuitry or processing device 210, and a number of current sources, such as the illustrated DC-DC converters 212. In certain embodiments, signals from one or more user input elements 115 may be communicated directly to the driver module 130, or alternatively through the communication module 132. The DC output signal may be used to directly power the control circuitry 210 and any other circuitry provided in the driver module 130, including the DC-DC converters 212, a communication interface 214, and the sensor module 140.

The DC output signal may also be provided to the power bus, which is coupled to one or more power ports (e.g., as part of a standard communication interface). The DC output signal provided to the power bus may be used to provide power to one or more external devices that are coupled to the power bus and separate from the driver module 130. These external devices may include the communication module 132, GNSS module 112 and any number of auxiliary devices, such as the sensor module 140.

As illustrated, the three respective DC-DC converters 212-1, 212-2, 212-3 of the driver module 130 provide currents $i_1$, $i_2$, and $i_3$ for the three LED strings S1, S2, and S3 in response to control signals CS1, CS2, and CS3. The control signals CS1, CS2, and CS3 may be pulse width modulated (PWM) signals that effectively turn the respective DC-DC converters 212-1, 212-2, 212-3 on during a logic high state and off during a logic low state of each period of the PWM signal.

Based on the power saving system and methods as will be described, the control circuitry 210 may adjust the currents $i_1$, $i_2$, and $i_3$ provided to each of the LED strings S1, S2, and S3 to effectively reduce the intensity of the resultant light emitted from the LED strings S1, S2, and S3 while maintaining the desired CCT. The control circuitry 210 may also monitor the output of the occupancy and ambient light sensors 140 for occupancy and ambient light information and further control the currents $i_1$, $i_2$, and $i_3$ in a desired fashion as will be described.

The control circuitry 210 may comprise a processing device and may be embodied as cpu, a processor, microprocessor, microcontroller or the like and associated memory 216, which contains the software instructions and data to facilitate operation as described herein. The memory 216 enables the control circuitry 210 to bidirectionally communicate with the communication module 132 or other devices over the communication bus through an appropriate communication interface (I/F) 214 using a defined protocol, such as the standard protocol described above. The control circuitry 210 may receive instructions or information from the communication module 132, GNSS module 112 or other device and take appropriate action to implement the received instructions. The instructions may include controlling how the LEDs 182 of the LED array 120 are driven, or returning operational data, such as temperature, occupancy, light output, or ambient light information, that may be collected by the control circuitry 210 to the communication module 132 or other device via the communication bus. In certain embodiments, the functionality of the communication module 132 may be integrated into the driver module 130, and vice versa.

In certain embodiments, the control circuitry 210 of the driver module 130 is loaded with a current model in the form of one or more functions or look up tables for each of the currents $i_1$, $i_2$, and $i_3$. Each current model is a reference model that is a function of dimming or output level, temperature, and CCT. The output of each model provides a corresponding control signal CS1, CS2, and CS3, which effectively sets the currents $i_1$, $i_2$, and $i_3$ in the LED strings S1, S2, and S3. The three current models are related to each other. At any given output level, temperature, and CCT, the resulting currents $i_1$, $i_2$, and $i_3$ cause the LED strings S1, S2, and S3 to emit light, which when combined, provides an overall light output that has a desired output level and CCT, regardless of temperature. While the three current models do not need to be a function of each other, they are created to coordinate with one another to ensure that the light from each of the strings S1, S2, and S3 mix with one another in a desired fashion.

The above-mentioned current models stored in memory 216 of the control circuitry 210 may correspond to one or more non-adaptive light level profiles or adaptive light level profiles as described herein. Such profiles may operate the lighting device based on the geospatial location, the date/time and battery condition. The profiles in such embodiment may be reestablished on a periodic (e.g., daily, weekly, monthly, or seasonally) basis and automatically altered from day to day, from week to week, from month to month, or from season to season such that one or more light emitters are operated differently at different times. Operating parameters such as brightness, intensity, time, power consumption, spectral content of the emissions of the lighting devices and/or other parameters may be adjusted based on an adapted profile as will be described.

Figure 7:
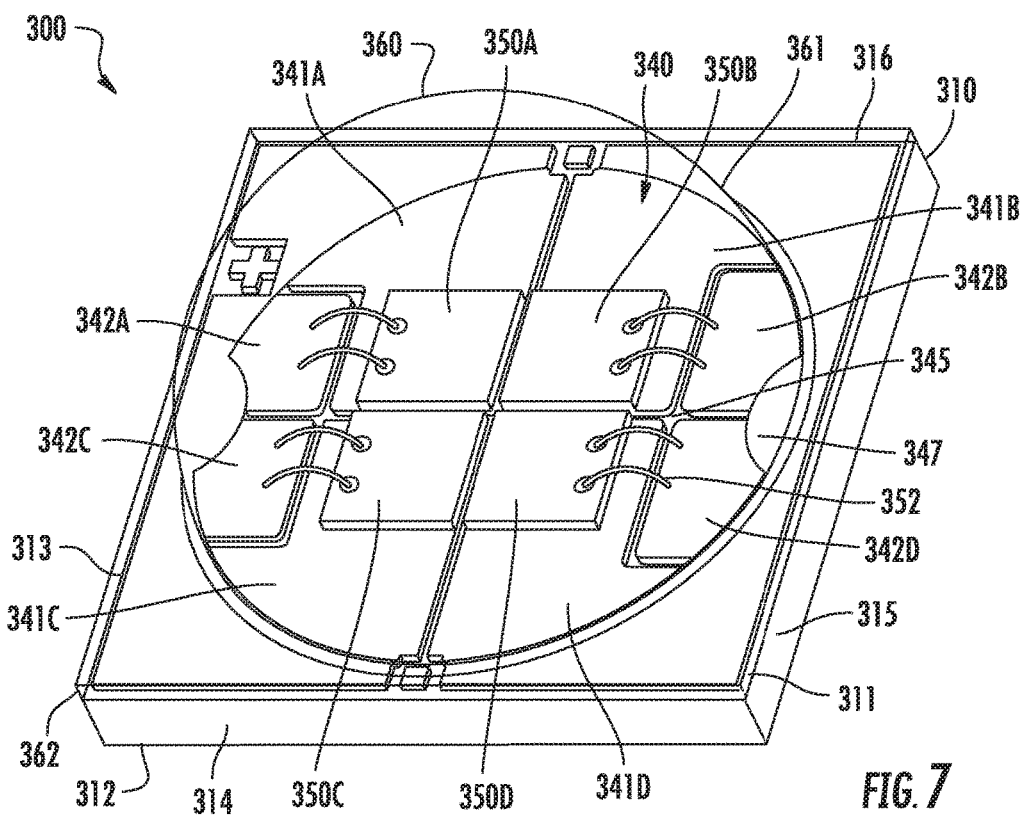
FIGS. 7 and 8 are a perspective view and a bottom view of an exemplary light emitter usable in the lighting device of the invention.

Although the preceding discussion of LEDs 182 has been directed primarily to single-chip LED packages, in certain embodiments lighting devices described herein may include multi-chip LED packages with separately controllable LED chips. FIG. 7 illustrates a solid state emitter, in the form of an emitter package 300 including multiple solid state emitters (e.g., LED chips). The emitter package 300 includes multiple (e.g., four) LED chips 350A-350D that may be separately controlled (e.g., via backside anodes 321A-321D and cathodes 322A-322D) and that are supported by an insulating substrate 310. The substrate 310, which may preferably comprise a ceramic material, includes an upper surface 311, a lower surface 312, and side walls 313-316 extending between the upper surface 311 and the lower surface 312. Electrical traces 340 are arranged over the substrate 310, including multiple die attach pads 341A-341D and additional electrical elements 342A-342D arranged proximate to the die attach pads 341A-341D. Where the die attach pads 341A-341D are electrically conductive, the LED chips 350A-350D may be arranged with bottom side contacts thereof in electrical communication with the die attach pads 341A-341D, and with top side contacts thereof in electrical communication with the electrical elements 342A-342D by way of wirebonds 352. The die attach pads 341A-341D and electrical elements 342A-342D may comprise one or more metals patterned on (or in) the upper surface 311 of the substrate 310. Gaps 345 may be provided between adjacent die attach pads 341A-341D and/or electrical elements 342A-342D to prevent undesired conductive electrical communication. In certain embodiments, die attach pads need not be electrically conductive, such as in cases where anode and cathode connections to a solid state emitter chip are both made with wirebonds. An insulating soldermask 347 is patterned over peripheral portions of the electrical traces 340, and a molded lens 360 (e.g., including a raised or hemispherical portion 361 and a base portion 362) is arranged over the upper surface 311 of the substrate 310 and is arranged to transmit at least a portion of light generated by the emitter chips 350A-350D.

LED chips 350A-350D of any suitable peak wavelength (e.g., color) may be used, and one, some, or all of the chips 350A-350D may be arranged to stimulate emissions of one or more lumiphors (e.g., phosphors). Although some or all of the LED chips 350A-350D may be separately controlled, in certain embodiments groups of two or more LED chips 350A-350D or groups of LED chips may be controlled together in a groupwise fashion. As noted previously, the package 300 may embody one or more LED components, with each LED component comprising at least one LED chip 350A-350D (optionally multiple LED chips), with one or more LED chips 350A-350D optionally arranged to stimulate emissions of one or more lumiphoric materials. In certain embodiments, the solid state emitter package 300 may include two LED components, with each LED component including two LED chips 350A-350D. In certain embodiments, the solid state emitter package 300 may include one, two, three, or four LED components. Although four LED chips 350A-350D are illustrated in FIG. 7, it is to be appreciated that a LED package may include any desirable number of LED chips, including groups of chips arranged in series, in parallel, or in series-parallel configurations.

Figure 8:
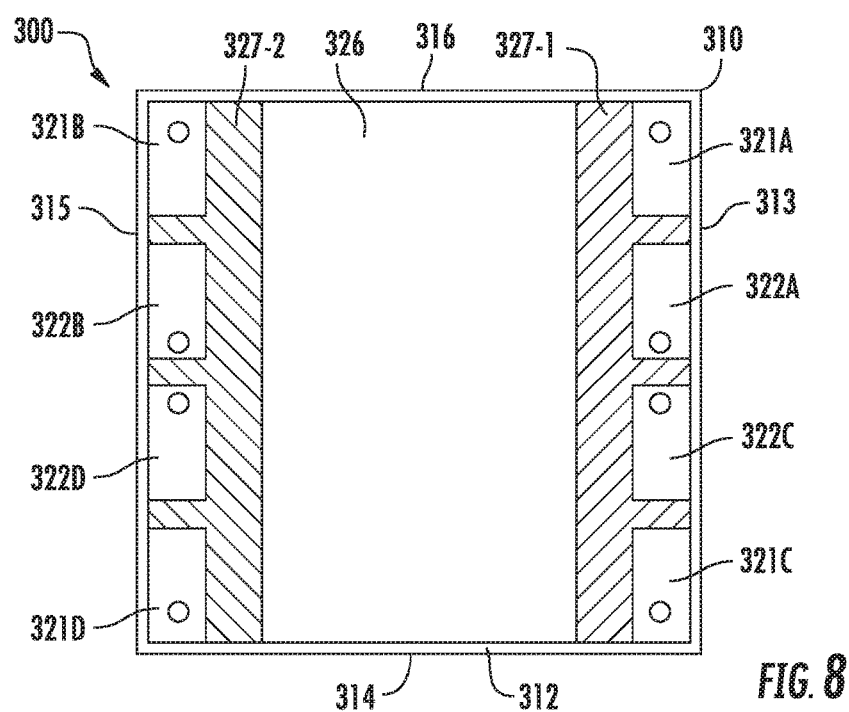

FIG. 8 is a bottom plan view of each of the emitter package 300 of FIG. 7. A lower surface 312 of the substrate includes four anodes 321A-321D and four cathodes 322A-322D patterned thereon (e.g., as electrical traces), with one paired anode/cathode per quadrant. The separate anodes 321A-321D and cathodes 322A-322D enable separate control of the multiple solid state emitters (e.g., LED chips) 350A-350B if desired. The various anodes 321A-321D and cathodes 322A-322D are separated by gaps that may be filled with solder mask material sections 327-1, 327-2. A thermal element (e.g., thermal spreading element) 326 may be arranged along the bottom surface 312 between the solder mask material sections 327-1, 327-2 and generally underlapping the solid state emitters 350A-350D. The thickness of the thermal element 326 may be the same as or different from (e.g., thicker than) the anodes 321A-321D and cathodes 322A-322D. As shown, the package 300 is devoid of any anode or cathode arranged on, or extending laterally beyond, any side wall 313-316 thereof.

By separately controlling different emitters (e.g., LED chips) of appropriate characteristics, the package 300 may be operated according to multiple operating states to yield aggregated emissions with different light output parameters. Examples of light output parameters that may be adjusted include: color point of emissions, color temperature of emissions, spectral content of emissions, luminous flux of emissions, and operating time. One or more emitter packages 300 may be utilized in lighting devices or lighting system as disclosed herein. In certain embodiments, such emitter packages may embody or be included in LED arrays as previously described herein.

Any of the embodiments disclosed herein may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. incorporated by reference herein. Additionally, any of the embodiments described herein can include driver circuitry disclosed in U.S. patent application Ser. No. 15/018,375, titled Solid State Light Fixtures Having Ultra-Low Dimming Capabilities and Related Driver Circuits and Methods, filed concurrently herewith on Feb. 8, 2016 and assigned to the same assignee as the present application, the entirety of this application being incorporated herein by reference In some embodiments, the driver module is included in the electronics housing as shown in the various embodiments described herein.

Suitable power supplies and drivers are described in U.S. patent application Ser. No. 13/462,388 filed on May 2, 2012 and titled "Driver Circuits for Dimmable Solid State Lighting Apparatus" which is incorporated herein by reference in its entirety; U.S. patent application Ser. No. 12/775,842 filed on May 7, 2010 and titled "AC Driven Solid State Lighting Apparatus with LED String Including Switched Segments" which is incorporated herein by reference in its entirety; U.S. patent application Ser. No. 13/192,755 filed Jul. 28, 2011 titled "Solid State Lighting Apparatus and Methods of Using Integrated Driver Circuitry" which is incorporated herein by reference in its entirety; U.S. patent application Ser. No. 13/339,974 filed Dec. 29, 2011 titled "Solid-State Lighting Apparatus and Methods Using Parallel-Connected Segment Bypass Circuits" which is incorporated herein by reference in its entirety; U.S. patent application Ser. No. 13/235,103 filed Sep. 16, 2011 titled "Solid-State Lighting Apparatus and Methods Using Energy Storage" which is incorporated herein by reference in its entirety; U.S. patent application Ser. No. 13/360,145 filed Jan. 27, 2012 titled "Solid State Lighting Apparatus and Methods of Forming" which is incorporated herein by reference in its entirety; U.S. patent application Ser. No. 13/338,095 filed Dec. 27, 2011 titled "Solid-State Lighting Apparatus Including an Energy Storage Module for Applying Power to a Light Source Element During Low Power Intervals and Methods of Operating the Same" which is incorporated herein by reference in its entirety; U.S. patent application Ser. No. 13/338,076 filed Dec. 27, 2011 titled "Solid-State Lighting Apparatus Including Current Diversion Controlled by Lighting Device Bias States and Current Limiting Using a Passive Electrical Component" which is incorporated herein by reference in its entirety; and U.S. patent application Ser. No. 13/405,891 filed Feb. 27, 2012 titled "Solid-State Lighting Apparatus and Methods Using Energy Storage" which is incorporated herein by reference in its entirety.

Figure 9:
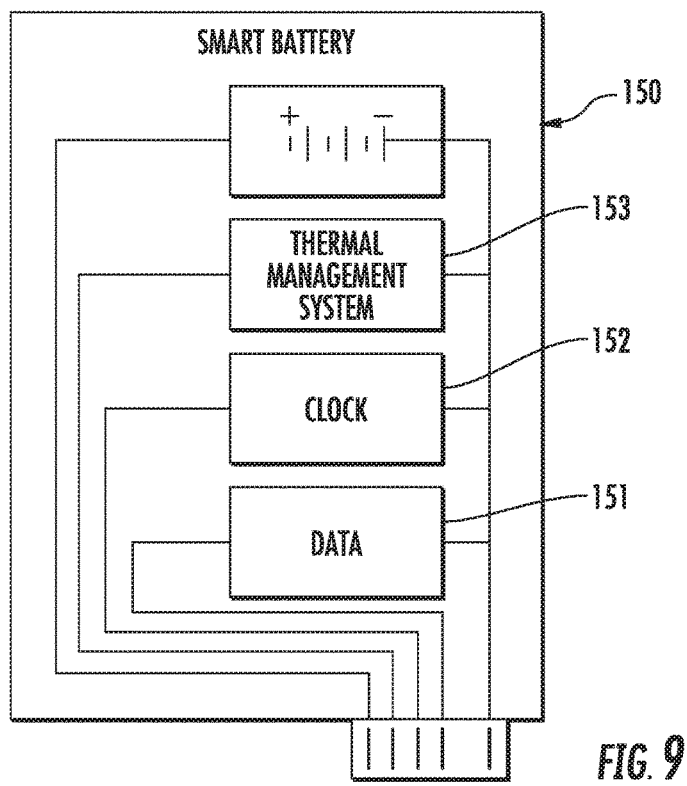
FIG. 9 is an embodiment of a block diagram of a smart battery usable in the system of FIG. 2.

An embodiment of the smart battery 150 is shown in FIG. 9. The smart battery 150 is based on a two-wire system consisting of separate lines for the data in memory 151 and clock 152 and uses a standardized communications protocol.

The battery contains permanent and temporary data in memory 151. The permanent data is programmed into the memory at the time of manufacturing and may include battery ID number, battery type, serial number, manufacturer's name and date of manufacture. The temporary data is acquired during use and consists of charge, state of health data, cycle count, use pattern, maintenance requirements and the like. The smart battery 150 may communicate the data to the driver module 130 to implement embodiments of the invention as will be described. While a smart battery has been described the system of the invention may be implemented with a smart charger or by a battery and charger that share control and data collection (collectively referred to as a "smart battery").

An embodiment of the GNSS module or receiver 112 is shown in FIG. 10. The GNSS receiver typically comprises an antenna 115 for receiving the satellite signals. The RF signals received by antenna are delivered to front end 117. The front end section receives the RF inputs from the antenna, and may perform down-conversion, filtering, amplification, and sampling (digitizing) of the captured signals. The front end may convert the analog GNSS signals to digital data streams in an intermediate frequency (IF) spectrum and finally to a baseband digital signal in-phase (I) and quadrature (Q) components. The baseband processing block 121 is responsible for the signal processing tasks, such as acquisition and tracking of each signal. The input of this block is typically a down-converted digital signal. The baseband processing block 121 may also accommodate any dedicated algorithms. The applications processing block 119 extracts information such as navigation data, such as geospatial position, time, date and combines this information to satisfy the requirements of the system. A communications port such as USART 123 is provided to allow the GNSS module to communicate with the driver module 130 and/or the communications module 132.

Figure 11:
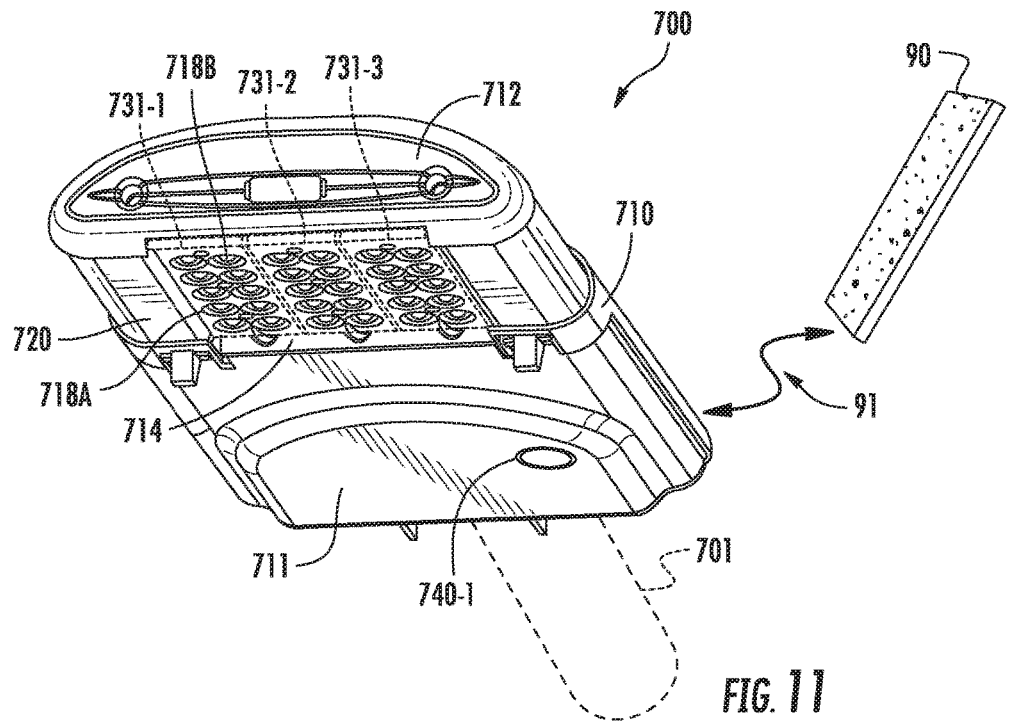
FIGS. 11 and 12 are perspective views showing a lighting device according to other embodiments of the invention.
Figure 12:
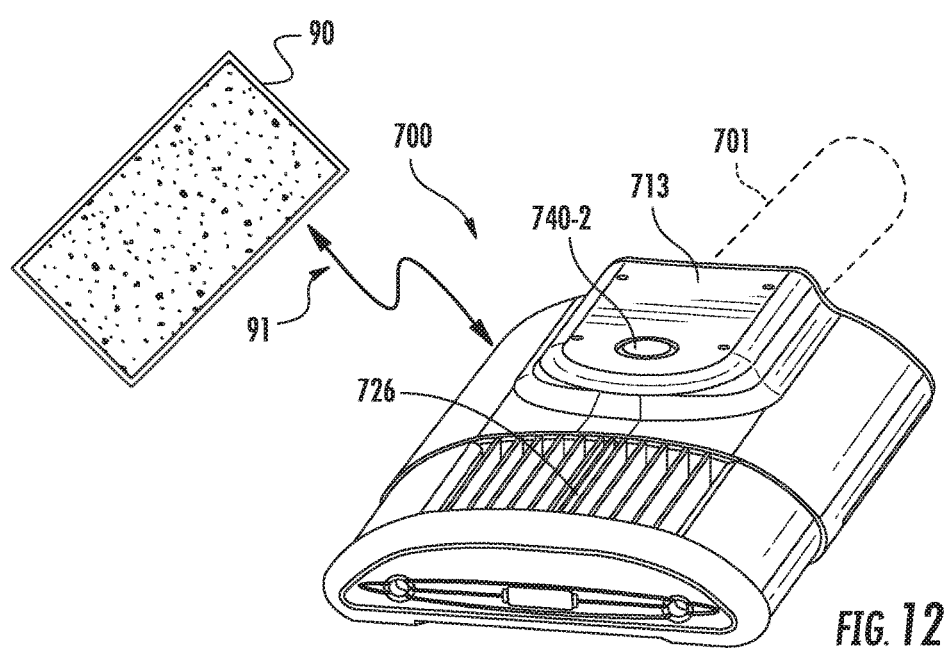

FIGS. 11 and 12 illustrate an outdoor floodlight (e.g., street or roadway lamp) 700 that may include multiple LED components as described herein. The lamp 700 includes a housing 710 including a base portion 711 supported by an elongated pole 701 or other support. The housing 710 supports the various components, modules and systems such as shown and described with reference to FIG. 2. Moreover a photovoltaic cell 90 such as shown in FIG. 1 may be associated with the lighting device of FIGS. 11 and 12 to recharge the battery. In the embodiment of FIG. 2 the photovoltaic cell may be positioned remote from the lighting device and may be connected to the lighting device by interface 91 such as a wire or cable connection. Multiple LEDs modules 731-1, 731-2, 731-3 each including multiple LEDs 718A, 718B arranged in an array provided along a lower surface 720 of the floodlight 700 between the pole 701 and an end cap 712. The LED modules 731-1, 731-2, 731-3 are arranged proximate to an air gap 714 permitting heat to be dissipated to a heat spreader or heat sink 726 (arranged along an upper surface 713 of the housing 710) and transferred to an ambient environment. The floodlight 700 may include at least one receiver or sensor element 740-1, 740-2, which may embody any one or more of GNSS receiver, a radio frequency receiver, an ambient light sensor, an image sensor, a temperature sensor, and occupancy sensor, a sound sensor, or the like. In certain embodiments, at least one receiver or sensor element 740-1 may be arranged along a lower surface 720 of the floodlight 700, and/or at least one receiver of sensor element 740-2 may be arranged along an upper surface of the floodlight 700. The floodlight is arranged to receive or determine information indicative of geospatial or geographic location (and optionally additional information such as time, time zone, and/or date) and automatically adjust one or more light output parameters based at least in part on such information to operate one or more electrically activated emitters differently on different days of a year and based on the status of the rechargeable battery. GNSS receiver 112 may be located in side of the housing 710 and sensor element 740-2 may be the antenna for the GNSS receiver. Signals received by the at least one receiver or sensor element 740-1, 740-2 may be used to control operation of the LEDs modules 731-1, 731-2, 731-3 to adjust light output parameters such as light intensity, brightness, color point of emissions, color temperature of emissions, spectral content of emissions, luminous flux and operating time.

Figure 13:
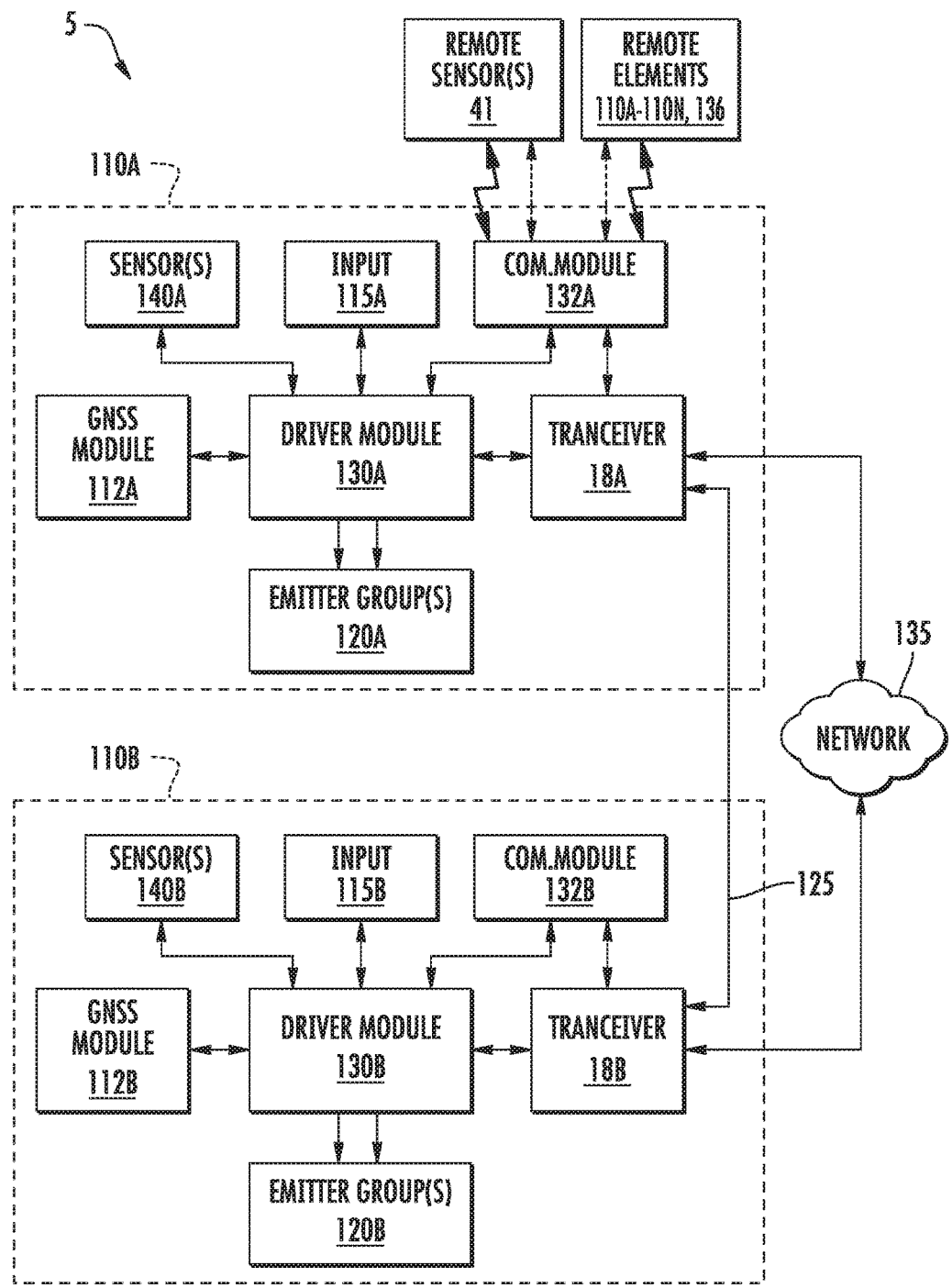
FIG. 13 is a block diagram showing an embodiment of a connected lighting devices in which the invention may be used.

FIG. 13 is a simplified schematic showing interconnections within and between two lighting devices 110A, 110E of a lighting system 5 according to one embodiment. While two lighting devices 110A, 110B are shown the connected system may comprise two or more lighting devices and may in some embodiments comprise a great number of lighting devices. The first lighting device 110A includes a driver module 130A, one or more sensors 140A. A user input element 115A, a communication module 132A, a transceiver 18A, a GNSS module 112A and one or more light emitter groups 120A. The second lighting device 110B includes a driver module 130B, one or more sensors 140B, a user input element 115B, a communication module 132B, a transceiver 18B, a GNSS module 112B and one or more emitter groups 120B. One or more remote sensors 41 and one or more remote input elements 110A-110N, 136 may be arranged in at least intermittent communication with one or more of the lighting devices 110A, 110B.

Depending on the system the lighting devices may communicate directly with one another using a wired connection or a wireless connection 125. In other embodiments the lighting devices may communicate over a network 135 using hard wired or land line connections or by using a wireless connections or by combinations of such connections. The wireless signals may include signaling information in accordance with the air interface standard of the applicable cellular system of the wireless telephone network that carries the wireless interface. In this regard, the communications modules 132, 132A, 132B may be configured to operate with one or more air interface standards, communication protocols, modulation types, and access types. By way of illustration, the communications modules 132, 132A, 132B may be configured to operate in accordance with any of a number of first, second, third, and/or fourth-generation communication protocols and/or the like. For example, the communications module 132, 132A, 132B may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The communications module 132 may also be configured to operate in accordance with non-cellular communication mechanisms, such as via a wireless local area network (WLAN) or other communication/data networks. The devices may also communicate with one another using any available RF link and may use satellite communication links as part of the communication network.

In one embodiment, the devices 110 form a wireless mesh network, such that communication between two endpoints may be accomplished via one or more hops. For example, the devices 110 may communicate with one another via Institute of Electrical and Electronics Engineers (IEEE) standard 802.15 or some variant thereof. Using a wireless mesh network to communicate among the devices may increase the reliability thereof and allow the wireless lighting network to span large areas. The devices 110A, 110B may also communicate with one another via a wired connection such as an Ethernet interface.

The devices 110A, 110B may exchange status information, sensor data, commands, and the like. Messages passed between the devices 110A, 110B may be individually addressed such that the messages are received by a single one of the devices, broadcast to a subset of the devices, or broadcast to all of the devices. Notably, each one of the devices 110A, 110B may be capable of operating independently of the others, and thus does not need to connect to a lighting network to function. In other words, the control logic for each one of the devices may be locally stored and executed, and does not require external input. When connected to a lighting network, the control logic of each one of the devices 110A, 110B may consider information provided via the lighting network, and therefore the behavior of each one of the devices 110A, 110B may be influenced by other devices in the network and/or one or more of the remote devices.

By enabling the lighting devices to communicate with one another a lighting device may communicate with one or more other lighting devices such that the devices can share information. This may be useful when a first lighting device lacks a clear connection to a desired GNSS signal, user input, other external signal, or other sensory input, but when a second lighting device has a clear connection. In other embodiments only selected ones of the lighting devices in a network of lighting devices may include the control logic, sensors, GNSS receiver or the like such that other connected lighting devices may be controlled by the selected ones of the lighting devices in a master/slave relationship. In such an instance, the selected lighting device 110A may receive a signal from a GNSS satellite, a user input device, a RF receiver, or one or more sensors, and the selected lighting device 110A may transmit the received information to other connected lighting devices 110B to permit the other lighting devices to take appropriate action (e.g., update geospatial position, update time/date, adjust profiles, and/or adjust operating parameters). Via either wired or wireless communication, one lighting device may propagate information to one or more other lighting devices, and the shared information may be used to automatically adjust one or more light output parameters to cause the lighting devices to operate one or more electrically activated emitters differently based at least in part on battery performance. The wireless and wired communications in the lighting network may occur in any number of communications standards/protocols.

In various embodiments described herein various smart technologies may be incorporated in the lamps as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," Application No. 61/932,058, filed Jan. 27, 2014, which is incorporated by reference herein in its entirety; and "Lighting Device with Operation Responsive to Geospatial Position" application Ser. No. 14/669,739, filed Mar. 26, 2015, which is incorporated by reference herein in its entirety.

Any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry can include at least one of a network component, an RF component, a control component, and one or more sensors. A sensor, such as a knob-shaped sensor, may provide an indication of ambient lighting levels and/or occupancy within the room or illuminated area. Other sensors are possible, and a sensor may be integrated into the light control circuitry as described herein.

Additionally, any of the luminaire embodiments described herein can include the smart lighting control technologies disclosed in U.S. Provisional Application Ser. No. 62/292,528, titled "Distributed Lighting Network", filed on Feb. 8, 2016 and assigned to the same assignee as the present application, the entirety of this application being incorporated herein by reference.

The various components of the lighting device such as the driver module 130, communications module 132, GNSS module 112, and smart battery 150 each may comprise control circuitry such as a processor, microprocessor, microcontroller or the like (processing device) and associated memory which contains the software instructions and data to facilitate operation as described herein. In describing the system of the invention the various steps may be performed in a single processing device or they may be performed in separate multiple processing devices distributed over the lighting device or even distributed among more than one lighting device where information, commands and instructions are shared between the various local memory devices and processing devices. As used herein, a "processing device," such as the control circuitry described herein, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory device. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. As used herein, a "memory" refers to a device or combination of devices that store one or more forms of computer-readable media for storing data and/or computer-executable program code/instructions. Computer-readable media is defined in greater detail below. For example, in one embodiment, the memory includes any computer memory that provides an actual or virtual space to temporarily or permanently store data and/or commands provided to the processing device when it carries out its functions described herein.

Moreover, various ones of the modules described with respect to lighting device 110 may share memory or processing devices. As used to describe the operation of the system the terms processing device and memory are used to refer to the various processing devices/control circuitry and memories of the lighting device collectively where different steps may be performed in different ones of the processing devices described herein. Operation of the power saving system of the invention will be described with reference to FIGS. 14, 15 and 16. The system uses light level profiles to control the light level of the lighting device during the active period of the lighting device. The active period is the period when the light emitters are powered to emit light. In one typical outdoor application the active period is at night between sunset and sunrise, however, the active period may be based on other parameters than night and day as will be explained. The non-adaptive light level profiles, shown in solid lines in FIGS. 14A-14D, define exemplary desired light emission profiles for the lighting device. The non-adapted light level profiles shown in solid lines in FIGS. 14A-14D are made by way of example only and the non-adaptive light level profiles used in the system of the invention may be other than those shown. The non-adaptive light level profile sets the light output parameters for the light emitters of the lighting device. In the embodiments shown, the time of day is graphed relative to the light level of the lighting device where the light level essentially relates to the luminous flux or light intensity emitted by the lighting device relative to full power. A light level of 0 means that the light emitters are turned off and no light is emitted by the light emitters. A light level of 100 means that the light emitters are emitting light at a maximum continuous steady state level. The light level may be referred to as a percentage of the maximum light level output by the lighting device. It will be appreciated that a light level of 100 may not be the theoretical maximum light output of the light emitters and may be considered the maximum output of the lighting device at a continuous steady state operation taking into account degradation of the light emitters, heat management and the like.

Figure 14A:
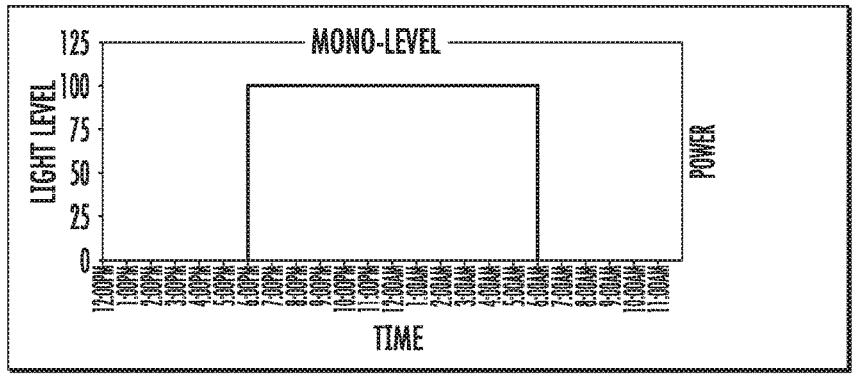
FIGS. 14A-14D show exemplary light level profiles usable in the system of the invention.
Figure 14B:
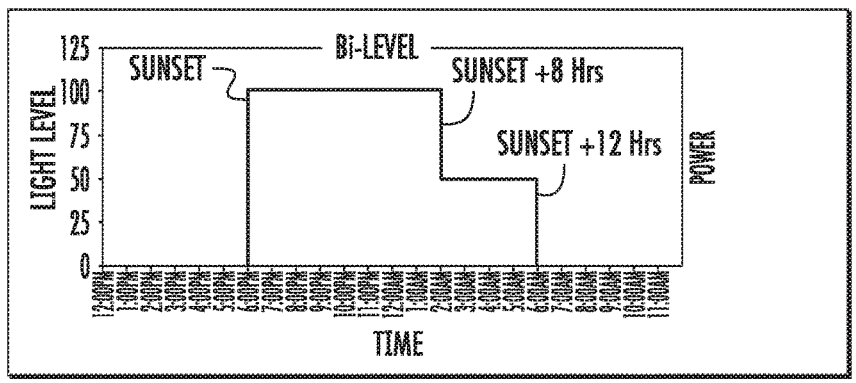
Figure 14C:
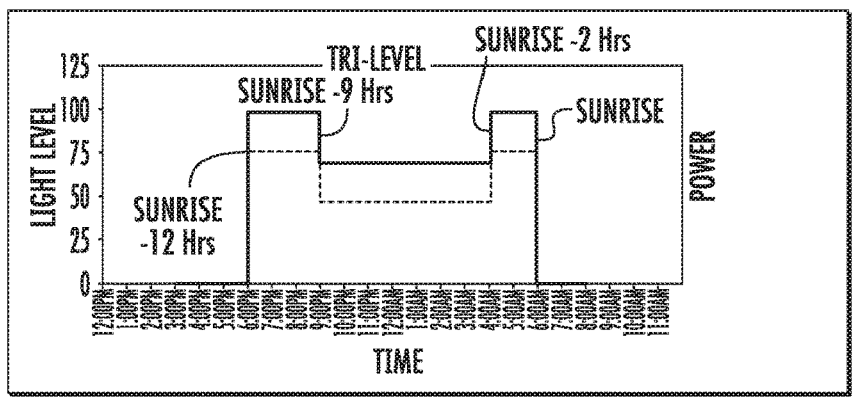
Figure 14D:
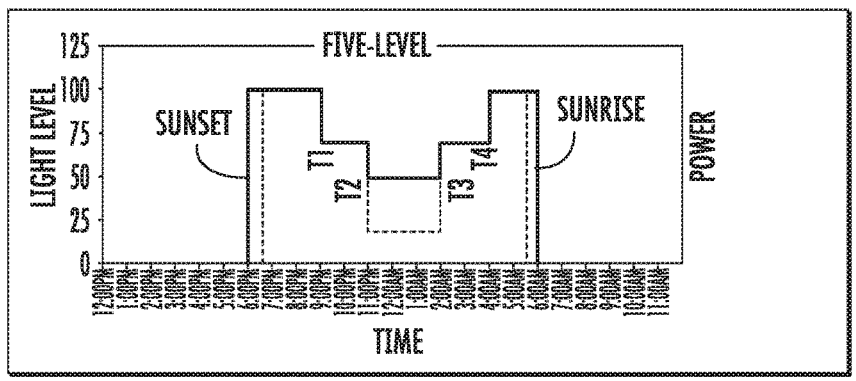

FIG. 14A shows a mono-level light level profile that is turned on to 100% at 6:00 pm and is turned off at 6:00 am. FIG. 14B shows a bi-level light level profile that is turned on to 100% at 6:00 pm; the light level is reduced to 50% at 2:00 am and the light is turned off (reduced to 0) at 6:00 am. Fig. C shows a tri-level light level profile that is turned on to 100% at 6:00 pm; the light level is reduced to 75% at 9:00 pm; the light level is increased again to 100% at 4:00 am; and the light is turned off (reduced to 0) at 6:00 am. FIG. 14D shows a five level light level profile that is turned on to 100% at 6:00 pm; the light level is reduced to 75% at 9:00 pm; the light level is reduced again to 50% at 11:00 pm; the light level is increased to 75% at 2:00 am; the light level is increased again to 100% at 4:00 am; and the light is turned off (reduced to 0) at 6:00 am. As used herein a "segment" of the light level profile is any light level on the profile curve between changes in light level. The stepped profiles are shown in FIGS. 14A-14D as horizontal lines. The profile of FIG. 14A has one segment; the profile of FIG. 15 B has two segments; the profile of FIG. 14C has three segments; and the profile of FIG. 14D has five segments. The times of level changes, the number of level segments and light levels are made by way of example only and the actual non-adaptive light level profiles may vary from those shown. Moreover, the profiles may have a more smooth curved profile than the step-wise profiles shown in the figures. In other embodiments the transitions between the steps may be ramped having more gradual transitions between segments. The rate of change of the ramped transitions may be user selectable to control the rate of change of light levels between the steps.

Because the system of the invention conserves battery life and maximizes operating times of the battery, the light levels may be considered in terms of power usage rather than light output. Thus, the level along the Y-axis of the profiles may be considered in terms of power drawn by the light emitters rather than light output. In a typical application the power drawn by the light emitters and the light output by the lighting device are related; however, the relationship may not be linear. Moreover, the lighting device may use other parameters to conserve power rather than light intensity. For example, certain light emitters or combinations of light emitters may be more efficient than other light emitters or combinations of light emitters such that the power drawn by the light emitters may be varied by changing parameters other than or in addition to light intensity. For example, power usage may be lowered by changing the color, color temperature, spectral content or the like of the light emitted by the light emitters. Because such changes in operating parameters may not be acceptable to all users in all conditions, in one preferred application of the invention the light intensity (i.e. light level) is the parameter varied to vary the power used by the light emitters. In such applications the profiles represent dimming profiles where light intensity is the variable parameter. The processing device is operatively coupled to the memory and is configured to: implement a non-adaptive light level profile for controlling the light emitters; determine if a state of charge of the battery is sufficient to run the non-adaptive light level profile; and to implement an adaptive light level profile for controlling the light emitters if the state of charge of the battery is not sufficient to run the non-adaptive light level profile. The light emitters consume less battery energy when operated under the adaptive light level profile than when operated under the non-adaptive light level profile. The processing device is configured to determine if a state of charge of the battery is sufficient to run the non-adaptive light level profile by comparing available energy of the battery to energy required to run the non-adaptive light level profile as will be described in detail below.

Moreover, while the non-adapted light profiles are shown with time of day along the X-axis, the X-axis may be considered as a time relative to sunrise/sunset rather than a time based on the 24 hour clock. Based on the date and geospatial position (latitude/longitude) of the lighting device the processor calculates the current sunset time, the following sunrise time and the length of night for the lighting device. The X-axis may be considered as time from sunset (sunset + hours), FIG. 14B, or time prior to sunrise (sunrise − hours), FIG. 14D, rather than a specific time based on the 24 hour clock. In some applications as discussed below the active period may have a user selected start time and/or end time where the X-axis represents time between the start and end times as either time of day based on the 24-hour clock or as start time + hours or stop time − hours.

Where the profile is based on daylight versus nighttime the processor may vary or shift the non-adaptive light level profile based on the calculated sunrise and sunset. In such an application the light emitters may be turned on at or near sunset and may be turned off at or near sunrise and the profile may be adjusted to accommodate for the varying length of night (the active period) over the course of a year. As such the length of the segments of the profile may be considered as percentages of the active period rather than hours. Thus, referring to FIG. 14D, the light level may be at 100% for the first 25% of the active period; the light level may be reduced to 75% for the next 17% of the active period; the light level may be reduced again to 50% for the next 25% of the active period; the light level may be raised to 75% for the next 17% of the active period; and the light level may be raised to 100% for the last 17% of the active period. As a result, the profile will shift relative to the 24 hour clock in response to the lengthening and shortening of the nighttime hour (active period) and the start and stop of the active period will shift based on the seasonal changes in sunrise and sunset. Thus, for example the active period will extend for a longer period of time in the winter than in the summer and sunset may move to earlier in the day.

In some embodiments the lighting device is used in outdoor applications where the lighting device will be used for illumination at night. In such an embodiment night (or darkness) may generally be considered the active period of the light emitters, i.e. the period of time when the light emitters are energized to produce light according to the light profile. While the invention has been described with respect to the active period being "night" the invention may be used to provide a light level profile for active periods that are not related to sunrise/sunset and night/day. For example, the system may be used in applications where the active period is related to work schedules, opening/closing times, or other parameters other than day/night. Moreover, the active period may at least in part be determined by sensors associated with the lighting device. For example a light sensor may be used such that the active period is initiated only if the ambient environment registers as dark on the sensor. In another example, a motion detector may be used as one of the sensors and the active period may only be initiated upon detection of motion that corresponds to occupancy of the local environment. The sensor may comprise other types of sensors such as light sensors, image sensors, temperature sensors or the like that start and/or stop the active period upon detection of a predetermined external condition. As used herein the term "active period" refers to nighttime/darkness as well as other times when the lighting device is operable to emit light.

Figure 15:
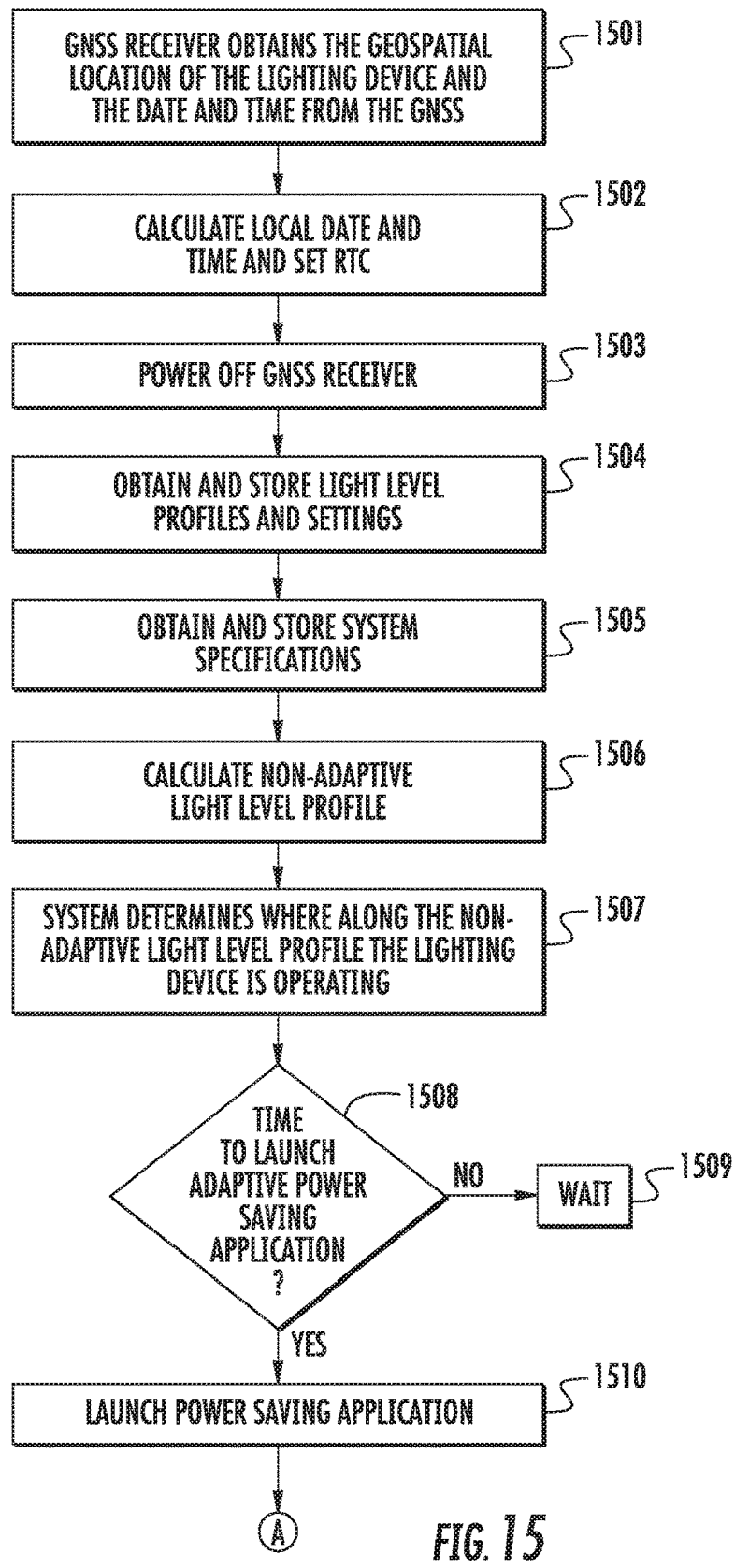
FIG. 15 shows a flow chart illustrating an embodiment of an initiation process for the system of the invention.
Figure 16A:
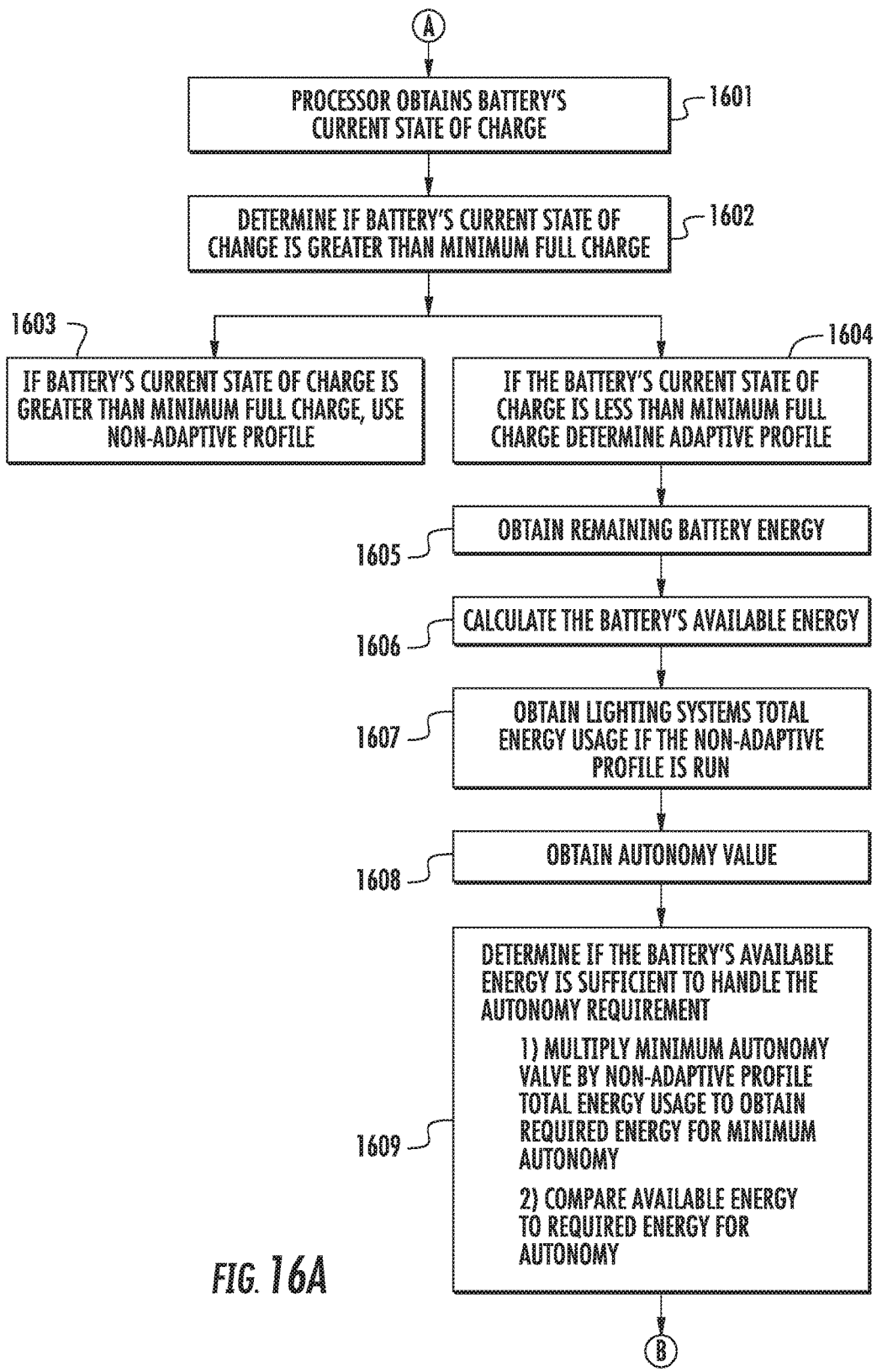
FIGS. 16A and 16B show a flow chart illustrating an embodiment of an adaptive light level process for the system of the invention.
Figure 16B:
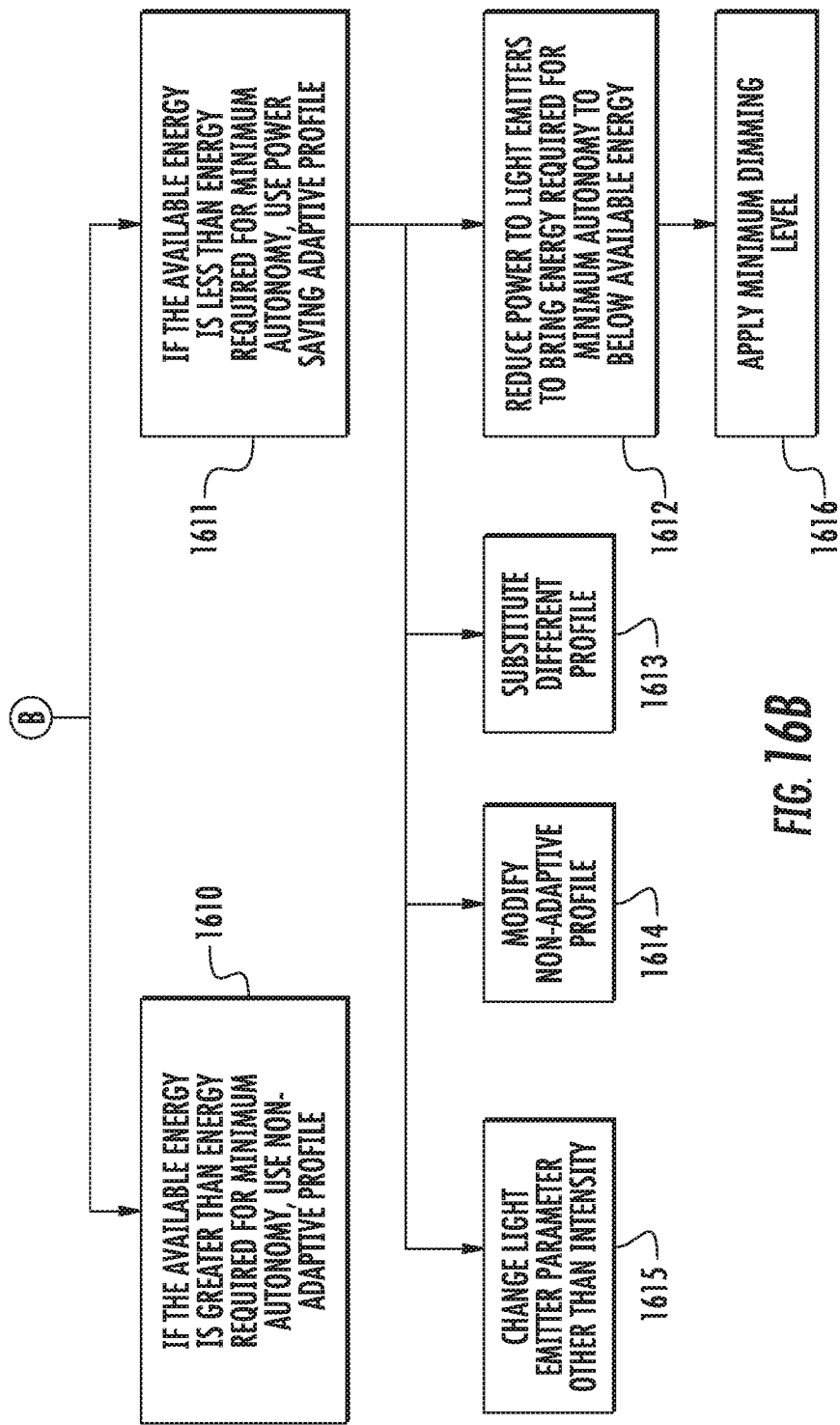

The operation of the system of the invention will be described with reference to FIG. 15. FIG. 15 shows the initiation process of the lighting device. Upon initialization of the system the GNSS receiver 112 obtains the geospatial location of the lighting device (Block 1501). The location information may be provided in the form of longitude and latitude and may be obtained from a global navigation satellite system (GNSS). One example of a GNSS is GPS although any suitable system may be used. The GNSS receiver may also receive the date and time from the GNSS satellite (Block 1501). The lighting device calculates the local solar date and time from the received information and sets the processing device's real time clock (RTC) based on the signal received from the GNSS (Block 1502). After receiving the GNSS information the GNSS receiver may be turned off (sleep mode) to save battery power (Block 1503). In some embodiments the system may convert the local solar date and time to the local date and time to account for time zones and daylight savings time adjustments. Use of local time may simplify the interface with the user simpler as the user could provide settings based on local time and date. The conversion between local solar date and time and the local date and time may be performed locally if sufficient memory is provided for the calculations or the calculations may be performed by the system remotely if the system is networked. In other embodiments the conversion may be performed by the user interface device (smart phone, computer) using configuration application such that the user is presented with the local date and time on the user interface device.

The system also obtains and stores in memory the user's selected non-adaptive profile and other settings choices (Block 1504). The settings choices may for example include minimum light level, autonomy period, initiation criteria, and the like. The user's selected non-adaptive profile and other settings choices may be stored in memory to be accessed for the adaptive dimming process as will be described. The settings and user selected non-adapted profiles may be uploaded to the communications module 132 from a user input device 136 or via the user input port 115. In some embodiments default profiles and default settings may be stored in memory that may be used if the customer does not commission individualized settings and profiles.

The system also obtains and stores in memory the system specifications such as battery storage capability, power level of the light emitters, amp-hours of the battery and the like (Block 1505). The system specifications may be stored in memory by the manufacturer. In some embodiments the user may have the option of selecting some of the parameters of the lighting device. For example the user may select the wattage of the light emitters, the lumen output of the lamp, the battery size and the like such that some of the system specifications may be downloaded to the system memory after the lighting system parameters are selected by the user.

At initialization the processing device calculates the initial non-adaptive light level profile (Block 1506). As previously explained, the non-adaptive light level profile may be based on solar time (i.e. the time of sunrise and sunset and the corresponding length of daylight and nighttime hours) which varies over the calendar year. As a result the specific non-adaptive light level profile depends on the geospatial location of the lighting device and the time/date. Thus, after the system obtains the geospatial information from the GNSS system it calculates the specific non-adaptive light level profile for the location of the lighting device at the current date based on the selected light level profile. As previously explained, the profile may include light level segments that are started and stopped relative to sunset and sunrise. As a result the non-adaptive light level profile will change as sunset and sunrise times change over the course of a year. The system calculates when sunset and sunrise occurs on a specific day for the specific location of the lighting device to establish the start and stop of the active period. The system then calculates when the different segments occur during the active period as previously described.

In other embodiments the profile may be based on the 24 hour clock rather than on the solar time where an entity such as a business directs that the lighting device turn on at the opening of the business and turn off at the closing time of the business. In such an embodiment the only calculation may be to accommodate daylight savings time and the profile may be based on the 24 hour clock. In some embodiments the profile may depend on both the solar time and the 24 hour clock. For example, the user may direct the lighting device to turn on at sunset (based on the solar time) and turn off at closing time (based on the 24 hour clock). In which case the system calculates when sunset occurs on a specific day for the specific location of the lighting device to establish the start of the active period. The system calculates when the different segments of the profile occur during the active period as previously described. The processing device calculates the non-adaptive light level profile for the lighting device based on the user selected non-adaptive light level profile and the geospatial location of the device and the solar clock or 24 hour clock as appropriate. Depending on the sensitivity of the system the non-adaptive light level profile may change and be recalculated every day for a solar time based active period.

The initialization steps may be repeated before every active period as required. For example, if the lighting device is to be active every night, the initialization steps described above may be repeated once every 24 hours, prior to the active period. In some embodiments not all of the initialization steps need to be repeated every 24 hours. For example, where the lighting device is in a fixed position the GNSS information may be obtained less frequently (e.g. every 3 days) rather than prior to every active period because the GNSS information will not vary significantly. However, periodic access of the GNSS information may be required to synchronize the clock, confirm the geospatial information or the like. In mobile applications the initialization steps may be repeated more often. If the user has the option of changing non-adaptive light level profiles the profile information may be updated before the calculation step of Block 1506.

After the system calculates the non-adaptive light level profile, the system determines where along the non-adaptive light level profile the lighting fixture is currently operating (Block 1507). The system uses the RTC and the calculated non-adaptive light level profile to determine where along the non-adaptive light level profile the lighting fixture is currently operating. For example, if the calculated non-adaptive light level profile starts at sunset the system uses the RTC to determine if the current time is before the calculated time of sunset. More broadly explained the system calculates the current time relative to the active period of the applicable non-adaptive light level profile to determine when the start of the active period of the non-adaptive light level profile occur.

At a predetermined time before the start of the active period the system initiates the adaptive power saving program (Block 1508). For example the adaptive power saving program may be run 30 minutes before the start of the active period as calculated in the non-adaptive light level profile. The system periodically checks the clock and if the time is greater than the predetermined time period, the system waits (Block 1509). If the time is equal to or less than the predetermined time period, the system launches the adaptive power saving application (Block 1510).

Upon initiation of the adaptive power saving application the processing device obtains the battery's current state of charge (Block 1601). The smart battery generates a signal that is received by the processing device that indicates the current state of charge of the battery. The current state of charge may be indicated as a percentage of total charge.

The processing device then obtains the battery's minimum full charge from the settings in memory and determines if the current state of charge of the battery is greater than a predetermined minimum full charge (Block 1602). The predetermined minimum full charge is a predetermined minimum state of charge that is determined to mean that the battery is fully charged to an acceptable minimum level for running the full non-adaptive light level profile. The predetermined minimum full charge may be different for different batteries, light emitters, profiles, weather conditions and the like.

If the system determines that the battery state of charge is greater than a predetermined minimum full charge the non-adaptive profile calculated during the initialization procedure described above is run and no adaptive dimming or power saving light level profile is set (Block 1603).

If the processing device determines that the battery state of charge is less than the predetermined minimum full charge, the system determines an adaptive light level profile (Block 1604). The first step in determining the adaptive profile is to obtain the remaining battery energy (Block 1605). In one embodiment the remaining battery energy may be calculated by multiplying the battery state of charge (e.g. percent of full charge) by the full battery energy. In some embodiments the smart battery may have the capability of providing the remaining battery energy directly to the processor such that this calculation may not be necessary to obtain the remaining battery energy.

The system then calculates the battery's available energy (Block 1606). The battery's available energy is the energy difference between the remaining battery energy as calculated above and the battery energy at the battery's maximum depth of charge. The battery's maximum depth of charge is the amount of available energy at the battery's lowest acceptable level of charge. If energy is drained from the battery below the battery's maximum depth of charge, the total lifetime of the battery may be severely impacted. For example a lead acid battery's maximum depth of charge may be approximately 20% where if the battery is discharged passed 20% (leaving the battery 80% charged) the lifetime of the battery may be permanently reduced. For a lithium-ion battery the maximum depth of charge may be approximately 35-40% where if the battery is discharged passed 35-40% (leaving the battery 60-65% charged) the lifetime of the battery may be permanently reduced. Thus the maximum depth of charge is known to the system for any given battery and is stored in system memory.

The system then obtains the lighting system's total energy usage if the non-adaptive light level profile is run (full profile energy) (Block 1607). In some embodiments the total energy usage if the non-adaptive profile is run at full power may be known for a given profile and may be available in a look-up table or the like. In other embodiments the, total energy usage may be calculated by the processing device based on the light emitters energy requirements for the controlling non-adaptive profile.

The system also obtains the autonomy value (Block 1608). The autonomy value is the maximum number of expected active periods between fully recharging of the battery. Where the active period is based on night/day, the autonomy value is the minimum number of days between charges. The autonomy value is determined by the system parameters and is dependent upon battery size and type, light level profile, lumen output, light emitter efficiency, temperature and the like and may be stored in memory. For example, the system may be designed such that the battery is expected be recharged every three days, in which case the autonomy value is three. In a typical lighting system using existing technology the autonomy value is typically between 3 and 7 active periods and may more typically be between 3 and 5 active periods. This value may vary. Because the battery is recharged using renewable energy sources the autonomy value typically is based on the expected temporary lack of the energy source (i.e. sunlight, wind energy or the like). Thus a system with an autonomy value of 3 is expected to be able to operate for three active periods without recharging.

The system then determines if the available energy is sufficient to handle the autonomy requirements set in the system (Block 1609). First, the system multiplies the autonomy value by the full profile energy to determine the required energy for the autonomy period. Second the system compares the required energy for the autonomy period to the available energy.

If the available energy is greater than the energy required for autonomy the full non-adaptive profile is run (Block 1610). In this manner the system knows if the full non-adaptive profile may be run for the autonomy period.

If the available energy is less than the energy required for the autonomy period, the power saving adaptive light level profile is used (Block 1611). The power saving adaptive light level profile may be a reduction in power to the light emitters to bring the energy required for the autonomy period below the available energy (Block 1612). The driver is arranged to selectively power the light emitters to adjust at least one operating parameter of the at least one light emitter based on the charge status of the battery. Where the power saving is achieved by reducing the light output of the light emitters the power saving level may be considered a dimming level. In one embodiment the power supplied to the light emitters may be reduced such that the energy required for the autonomy period is less than the available energy. For example if the available energy is 20% less than the energy required for the autonomy period operated under the non-adaptive light level profile, the power to the light emitters is reduced 20% and the light emitters are dimmed to the light output corresponding to that power level using the adaptive light level profile. In other words if the available energy is 0.80 of the energy required for the autonomy period the energy delivered to the emitters is reduced to 0.80 of full power. In order to ensure that there is sufficient power during the autonomy period the system may use a safety margin in the calculation of the adaptive light level profile such that if the available energy is 20% less than the energy required for the autonomy period the power to the light emitters is reduced 20% plus the safety margin (e.g. 3%) to reduce the power by 23%. Where the power reduction is obtained by reducing the power to the light emitters, the shape of the profile may remain the same where the levels of the steps are reduced by the calculated power reduction. Thus, referring to FIG. 14C, the non-adaptive light level profile is shown in solid line while the power saving adaptive light level profile is shown in dashed line.

In some embodiments the adaptive profile may have a different shape than the non-adaptive profile rather than simply reducing the light levels as previously described. For example a variety of light level profiles may be stored in memory (see for example FIGS. 14A-14C) where each light level profile has a known energy consumption. In such an embodiment a profile having the desired energy reduction may be used as the adaptive light level profile in place of the original non-adaptive profile in order to obtain the desired power savings (Block 1613). For example in a simple comparison the profile of FIG. 14B uses approximately 16% less energy than the profile of FIG. 14A, such that if the profile of FIG. 14A is the non-adaptive profile and a 15% reduction in power consumption is required, the profile of FIG. 14B may be substituted for the profile of FIG. 14A.

In another embodiment the same profile may be used as both the non-adaptive profile and the adaptive profile but the adaptive profile may be modified in some manner other than an overall reduction in light level as explained with respect to FIG. 14D (Block 1614). For example as shown in FIG. 14D the ends of the profile may be truncated and/or one or more segments of the profile may be reduced while maintaining full power in the other segments as shown in dashed lines.

In other embodiments another output parameter or combination of output parameters may be altered to achieve the desired energy reduction in place of or in addition to intensity. For example, the driver module may change the color, color temperature, spectral content or the like of the emitted light to the extent that changing the parameters results in the desired power savings. In some embodiments more than one parameter may be changed.

The various methods of reducing power consumption described above may be used individually or in combinations. Moreover, different ones of the methods of reducing power consumption described above may be used under different conditions. For example, during the work week light intensity may be reduced as explained with respect to Block 1612 while on weekends a different adaptive profile may be substituted as explained with respect to Block 1613 such that the condition may be considered temporal (date, season, day etc.). In other embodiments the condition may be geospatial (e.g. latitude, longitude, GPS coordinates etc.). In other embodiments, the conditions may be societal (urban, rural, suburban, industrial, residential etc.). The conditions may be saved in memory as settings. The settings may be user selected and may be modifiable by the user. Other conditions may also be applied.

Where light dimming is used to set the adaptive profile, the user may determine a minimum allowable dimming level and the minimum dimming level may be saved in memory as a setting. The system applies the minimum dimming level when generating the adaptive light level profile (Block 1616). A minimum allowable dimming level is the lowest allowable light level allowed by the user. For example a user may instruct the system that the lowest allowable light level is 25%. Before using the adaptive profile described above the processing device determines if for any segment of the light profile the use of the adaptive profile would bring the light level to below the minimum level set by the user (e.g. 25%). For a given profile the system determines if the adaptive profile would result in any segment falling below the user set minimum level. If the adaptive profile would result in a segment falling below the user set minimum level, the light level for that segment is set to the minimum level. If the adaptive profile would not result in a segment falling below the user set minimum level, the light level for that segment is set to the adaptive value.

Where the profile is a smooth curve the system would determine if the adaptive profile would result in any portion of the curve falls below the user set minimum level. If so, the light level for that portion of the curve is set to the minimum level. Any portion of the curve that would fall below the minimum level may be considered a segment of the curve where the light is maintained at the minimum level for that segment of the profile. For a smooth curve profile any portion of the curve may be considered a segment of the curve and be adjusted relative to the remainder of the curve.

After the system determines if the non-adaptive light level profile or the adaptive light level profile is to be used for the next active period, the system waits until the start time for that profile to power the light emitters and turn on the lighting device. In some embodiments the system will only turn on the light emitters if the ambient conditions require lighting even if the profile start time would otherwise start the light emitters. For example, it may be desirable to start the active period only if the ambient environment for the lighting device is actually dark regardless of the profile. A light sensor 140 may be provided for this purpose that is in communication with the communications module 132. The light sensor 140 may transmit a signal when the ambient environment attains a desired darkness. If the processor does not receive the signal the light emitters are not powered regardless of the status of the light level profile. If the processor receives the signal the light emitters are powered according to the light level profile.

At the end of the active period (e.g. after sunrise in some embodiments) the light emitters are turned off and the system returns to the beginning of the initiation sequence described above with respect to FIG. 15 and the sequence is repeated.

As previously explained, during the initiation sequence the processing device will query whether the user has changed the desired light level profile or input any other new settings.

At the end of the active period the system may also determine if a request for log data has been received and if a request has been received will send out log data to a user device via the communications port. The system may maintain a log of all relevant activity of the system and the smart battery. This information may include active profiles, power consumption, state of health of the battery, light emitters or the like or other information.

In some embodiments the processing device may be put in sleep mode during inactive periods to save power until it either wakes up periodically based on the RTC or due to the receipt of a command.

Figure 17:
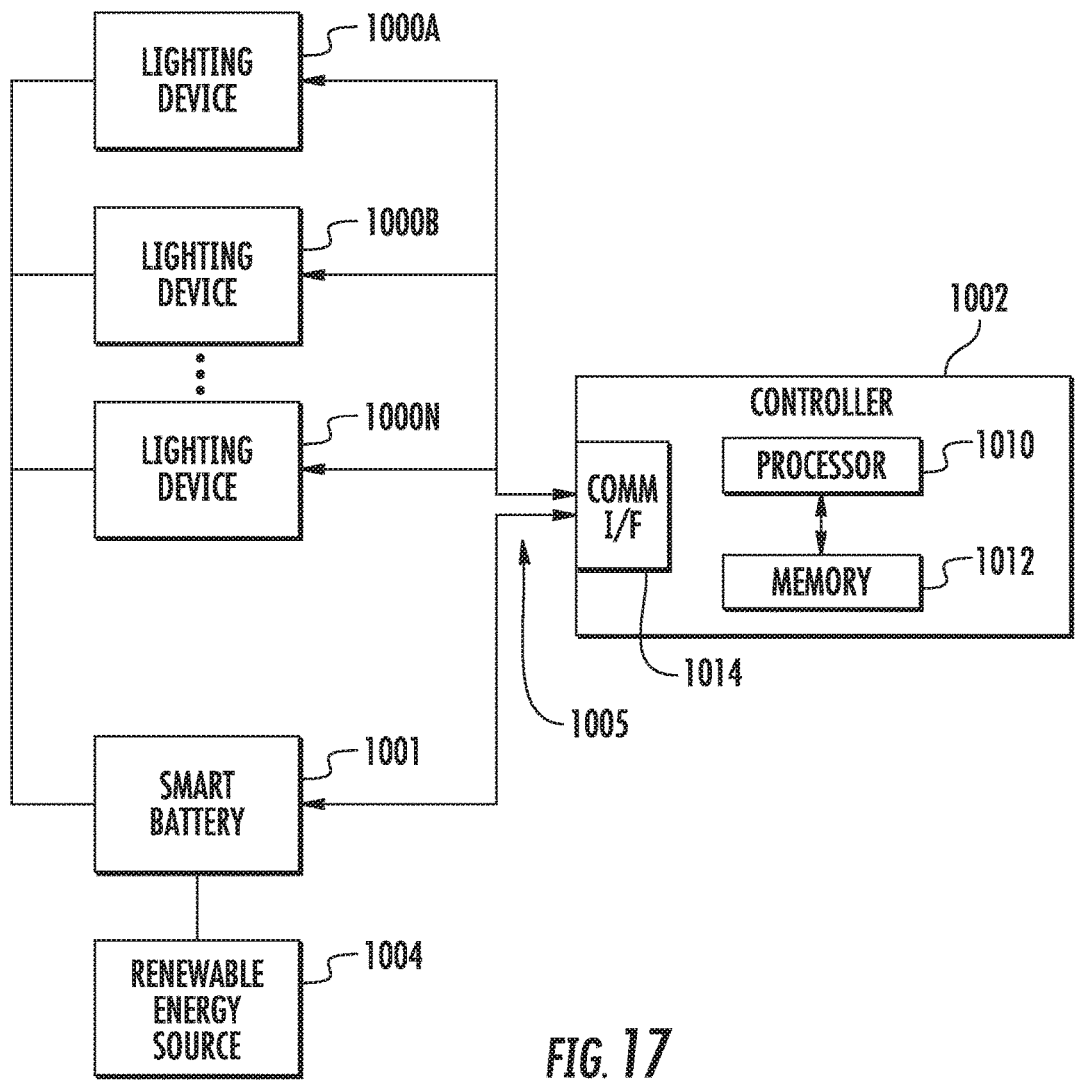
FIG. 17 discloses a lighting system in accordance with embodiments of the invention.

FIG. 17 discloses a networked lighting system where a plurality of lighting devices 1000A-100N are powered from a single renewable battery source 1001 and controlled by a single controller 1002. In the system of FIG. 17 the control of the light sources is managed by the controller 1002 such that the single controller manages the power consumption of all of the light sources on the network. The controller may comprise a processor 1010, memory 1012 and communication interface 1014 as previously described. In the system of FIG. 17 single renewable smart battery source 1001 may a single battery or a plurality of individual batteries in a bank. The system may also include a renewable energy source 1004, such as a photovoltaic panel, for recharging battery 1001 that may be co-located with the battery or may be located remotely from the battery. The controller 1002 is connected to the battery to obtain battery status information as previously described. The controller 1002 is network connected to the plurality of light devices 1000A-1000N as previously explained such that the controller can communicate with the light sources. The controller 1002 obtains information such as profiles, settings and the like for the individual lamps as explained with respect to Block 1504 and system specifications for the individual lamps as explained with respect to Block 1505. The controller 1002 performs the steps of FIGS. 15, 16A and 16B to determine whether the adaptive or non-adaptive profiles are to be used for each of the lighting devices. The controller then transmits control instructions over communication link 1005 to each of the lighting devices 1000A-1000N instructing the driver module of each of the lighting devices as to which light level profile that lighting device is to operate under. In some embodiments each of the lighting devices may operate under the same non-adaptive and adaptive light level profiles such that each of the lighting devices operates in the same manner. In other embodiments each of the lighting devices may operate under an individualized non-adaptive and/or adaptive light level profile. As a result the lighting devices 1000A-1000N may operate in different manners both in the non-adaptive state and in the adaptive state. Thus, in the adaptive state the power consumed by one lighting device 1000A-1000N may be reduced more or less than the power consumed by another of the lighting devices 1000A-1000N to thereby control the power consumption based on the total power consumed by all of the lighting devices. In the system of FIG. 17 the lighting devices may also be in networked communication with one another.

As will be appreciated by one of skill in the art, the present invention may be embodied as a method (including, for example, a computer-implemented process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium. Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processing device to produce a particular machine, such that the code portions, which execute via the processing device, create mechanisms for implementing the functions/acts specified in the flowchart and/or block diagram block or blocks.

These computer-executable program code portions may also be stored in a computer-readable memory that can direct a processing device to function in a particular manner, such that the code portions stored in the computer readable memory produce an article of manufacture including instruction mechanisms which implement the function/act specified in the flowchart and/or block diagram block(s).

As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processing device is illustrated or described herein, the processing device may be made up of a plurality of microprocessors, microcontrollers or other processing devices which may or may not be coupled to one another. Likewise, where a memory is illustrated or described herein, the memory may be made up of a plurality of memory devices which may or may not be coupled to one another.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A lighting device system comprising:
at least one light emitter;
a rechargeable battery for powering the at east one light emitter, the battery having a charge status;
a driver arranged to selectively power the at least one light emitter to adjust at least one operating parameter of the at least one light emitter based on the charge status of the battery wherein the driver powers the at least one light emitter according to anon-adaptive light level profile for an active period and the charge status of the battery is based on an autonomy value, the autonomy value defining a plurality of active periods between fully recharging of the battery.

2. The lighting device system of claim 1 wherein the driver is in communication with a GNSS receiver, the GNSS receiver providing geospatial information used by the driver to adjust the at least one parameter.

3. The lighting device system of claim 1 wherein the non-adaptive light level profile is a function of the at least one operating parameter over a period of time.

4. The lighting device system of claim 3 wherein the at least one operating parameter is selected from at least one of power consumed by the at least one light emitter and light intensity of light emitted by the at least one light emitter.

5. The lighting device system of claim 3 wherein the period of time is determined based on a geospatial location of the at least one light emitter.

6. The lighting device system of claim 1 wherein the driver is arranged to selectively power the at least one light emitter according to an adaptive light level profile, where the at least one light emitter consumes less power when operated under the adaptive light level profile than when operated under the non-adaptive light level profile.

7. The lighting device system of claim 6 wherein the adaptive light level profile is created based on the charge status of the battery.

8. The lighting device system of claim 1 wherein the battery is rechargeable and is charged by a renewable energy source.

9. The lighting device system of claim 1 wherein the at least one light emitter comprises a plurality of LEDs arranged in an array, the driver selectively powering the plurality of LEDs to change the energy drawn from the battery by the plurality of LEDs based on a comparison of available energy of the battery to energy required to run the non-adaptive light level profile.

10. A lighting device system comprising:
at least one light emitter;
a battery for powering the at least one light emitter;
a memory; and
a processing device operatively coupled to the memory, wherein the processing device is configured to:
implement a non-adaptive light level profile for controlling the at least one light emitter, the non-adaptive light level profile comprising a plurality of light levels;
determine if a state of charge of the battery is sufficient to run the non-adaptive light level profile;
implement an adaptive light level profile for controlling the at least one light emitter if the state of charge of the battery is not sufficient to run the non-adaptive light level profile, the adaptive light level profile comprising a plurality of light levels, where the at least one light emitter consumes less energy when operated under the adaptive light level profile than when operated under the non-adaptive light level profile.

11. The lighting device system of claim 10 comprising a plurality of lighting devices where the plurality of lighting devices are powered by the battery, wherein the processor is in network communication with the plurality of lighting devices.

12. The lighting device system of claim 10 wherein the processing device is in communication with a GNSS receiver, the GNSS receiver providing geospatial information to the processing device.

13. The lighting device system of claim 12, wherein the processing device is configured to calculate the non-adaptive light level profile based at least in part on the geospatial information.

14. The lighting device system of claim 10 wherein the non-adaptive light level profile is a first function of power drawn from the battery over time and the adaptive light level profile is a second function of power drawn from the battery over time, the non-adaptive light level profile and the adaptive light level profile each being based at least in part on solar time.

15. The lighting device system of claim 10 wherein the non-adaptive light level profile is a first function of power drawn from the battery over time and the adaptive light level profile is a second function of power drawn from the battery over time, the non-adaptive light level profile and the adaptive light level profile each being based at least in part on a 24 hour clock.

16. The lighting device system of claim 10 wherein the processing device is configured to determine if a state of charge of the battery is sufficient to run the non-adaptive light level profile for an autonomy period.

17. The lighting device system of claim 10 wherein the light intensity of the at least one light emitter is less when operated on the adaptive light level profile than when operated on the non-adaptive light level profile.

18. The lighting device system of claim 10 wherein the processing device is configured to determine if a state of charge of the battery is sufficient to run the non-adaptive light level profile by comparing available energy of the battery to energy required to run the non-adaptive light level profile where the available energy is based at least in part on a maximum depth of charge of the battery.

19. A method of operating a lighting device system comprising at least one light emitter and a rechargeable battery for powering the at least one light emitter, the method comprising:
  controlling the at least one light emitter using a non-adaptive light level profile where the non-adaptive light level profile requires a first amount of energy, the non-adaptive light level profile comprising a plurality of light levels;
  determining if a state of charge of the battery is sufficient to run the non-adaptive light level profile;
  controlling the at least one light emitter using an adaptive light level profile if the state of charge of the battery is not sufficient to run the non-adaptive light level profile where the non-adaptive light level profile requires a second amount of energy that is less than the first amount of energy, the adaptive light level profile comprising a plurality of light levels;
  calculating at least one of the adaptive light level profile and the non-adaptive light level profile using a geospatial location of the at least one light emitter.

* * * * *

UNITED STATES PATENT AND TRADEMARK OFFICE
CERTIFICATE OF CORRECTION

PATENT NO. : 10,211,660 B2
APPLICATION NO. : 15/190832
DATED : February 19, 2019
INVENTOR(S) : Underwood et al.

Page 1 of 1

It is certified that error appears in the above-identified patent and that said Letters Patent is hereby corrected as shown below:

In the Specification

Column 20, Line 18: delete "110E" and insert -- 110B --

In the Claims

Column 34, Claim 1, Line 11: delete "to anon-adaptive" and insert -- to a non-adaptive --

Signed and Sealed this
Ninth Day of July, 2019

Andrei Iancu
*Director of the United States Patent and Trademark Office*